United States Patent
Yoshida

(10) Patent No.: US 8,189,256 B2
(45) Date of Patent: May 29, 2012

(54) GAIN EQUALIZER, OPTICAL AMPLIFIER, LOSS COMPENSATION METHOD, AND OPTICAL AMPLIFICATION METHOD

(75) Inventor: Fumisato Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 722 days.

(21) Appl. No.: 12/329,943

(22) Filed: Dec. 8, 2008

(65) Prior Publication Data

US 2009/0154929 A1 Jun. 18, 2009

(30) Foreign Application Priority Data

Dec. 13, 2007 (JP) ................................ 2007-321927

(51) Int. Cl.
*H01S 3/00* (2006.01)
(52) U.S. Cl. ................ 359/337; 359/337.1; 359/337.11
(58) Field of Classification Search .................. 359/337, 359/337.1, 337.11
See application file for complete search history.

(56) References Cited

U.S. PATENT DOCUMENTS

| 2003/0179997 | A1* | 9/2003 | Hwang et al. .................. 385/34 |
| 2006/0268394 | A1* | 11/2006 | Sommer et al. ............ 359/337.5 |
| 2008/0094692 | A1 | 4/2008 | Yoshida |

FOREIGN PATENT DOCUMENTS

| JP | 2002506226 A | | 2/2002 |
| JP | 2005049458 A | | 2/2005 |
| JP | 02006203179 A | * | 8/2006 |

* cited by examiner

*Primary Examiner* — Mark Hellner

(57) ABSTRACT

A gain equalizer for compensation a variation of intensity among a plurality of optical signals each including a different wavelength in a wavelength multiplexed optical signal includes an input part for receiving the wavelength multiplexed optical signal, an outputting part and a gain equalizing unit for repeatedly giving a loss to the wavelength multiplexed optical signal received by the input part, and for outputting the wavelength multiplexed optical signal to the outputting part. Here, the loss is set for each wavelength and is smaller than a loss characteristic required for compensation the variation of intensity.

18 Claims, 16 Drawing Sheets

GAIN EQUALIZER, OPTICAL AMPLIFIER, LOSS COMPENSATION METHOD, AND OPTICAL AMPLIFICATION METHOD

INCORPORATION BY REFERENCE

This application is based upon and claims the benefit of priority from Japanese Patent Application No. JP 2007-321927, filed on Dec. 13, 2007, the disclosure of which is incorporated herein in its entirety by reference.

BACKGROUND OF THE INVENTION

1. Technical Field

The present invention relates to a gain equalizer and a loss compensation method for compensating a deviation of loss among a plurality of optical signals each including a different wavelength in a wavelength multiplexed optical signal, an optical amplifier provided with the gain equalizer, and an optical amplification method using the gain equalizer.

2. Background Art

A wavelength division multiplex (WDM) communication system is well-known in optical communication systems. In the WDM communication system, a plurality of optical signals each having a different wavelength is multiplexed and transmitted. For the WDM communication system, several kinds of optical components, for example, a dispersion compensating fiber (DCF) for dispersion compensation, a gain equalizer and an optical amplifier are often used. Here, the gain equalizer is used for compensation a variation of gain among optical signals generated by amplification in the optical amplifier.

In a related art 1 (Published Japanese translation of PCT application No. 2002-506226 bulletin), an optical device with an arrayed-waveguide grating (AWG) for dispersion compensation is described. The optical device includes the AWG formed by the DCF, and an input line and an output line which are arranged for each waveguide. In the related art 1, the input line is connected to the output line so that the plurality of waveguides of the AWG is connected to each other in series, and optical signals pass through the plurality of waveguides. Therefore, dispersion generated in the optical signals is compensated.

A gain equalizer with one input port and one outputting port is described in a related art 2 (Japanese Patent Application Laid-Open No. 2005-49458). The gain equalizer is set a prescribed equivalent characteristic, and flattens the variation of gain among amplified optical signals by giving a loss corresponding to the equivalent characteristic to the optical signals.

Moreover, one of the technologies that relates to this invention is described in a related art 3 (US2008/0094692A1). The related art 3 describes a technology of a variable optical attenuator for keeping intensity of optical signals output from an optical amplifier constant, however, the related art 3 doesn't describe a technology of a gain equalizer for compensation a variation of intensity thereamong.

SUMMARY

An object of the present invention is to provide a low-cost gain equalizer and a low-cost loss compensation method, which can decrease a loss characteristic given to the gain equalizer and a variation of loss among optical signals each having a different wavelength in a wavelength multiplexed optical signal.

Moreover, an object of the present invention is to provide a low-cost optical amplifier and a low-cost optical amplification method, which do not need to use a plurality of gain equalizers in an optical amplifier provided with the above-mentioned gain equalizer even when a larger loss characteristic than a loss characteristic which can be set to a gain equalizer is required.

A gain equalizer according for an exemplary object of the invention, which is for compensation a variation of intensity among a plurality of optical signals each including a different wavelength in a wavelength multiplexed optical signal, includes an input part for receiving the wavelength multiplexed optical signal, an outputting part and a gain equalizing unit for giving a loss repeatedly to the wavelength multiplexed optical signal received by the input part and outputting the wavelength multiplexed optical signal to the outputting part. Here, the loss is set for each wavelength in the wavelength multiplexed optical signal and is smaller than a loss characteristic required for compensation the variation of intensity.

An optical amplifier according for an exemplary object of the invention includes a gain equalizer for giving a loss repeatedly to a wavelength multiplexed optical signal and an optical amplification unit connected with the gain equalizer. Here, the loss is set responding to a wavelength dependency of gain of the optical amplification unit and is smaller than a loss characteristic which is opposite to the wavelength dependency.

A loss compensation method according for an exemplary object of the invention, which is for compensation a variation of intensity among a plurality of optical signals each including a different wavelength in a wavelength multiplexed optical signal includes receiving the wavelength multiplexed optical signal giving a loss repeatedly to the received wavelength multiplexed optical signal and outputting the wavelength multiplexed optical signal with the loss. Here, the loss is set for each wavelength in the wavelength multiplexed optical signal and is smaller than a loss characteristic required for compensation the variation of intensity.

An optical amplification method according for an exemplary object of the invention includes receiving a wavelength multiplexed optical signal, amplifying intensity of the wavelength multiplexed optical signal, giving a loss repeatedly to the wavelength multiplexed optical signal and outputting the wavelength multiplexed optical signal which is amplified and given the loss. Here, the loss is set responding to a wavelength dependency of gain and is smaller than a loss characteristic which is opposite to the wavelength dependency.

BRIEF DESCRIPTION OF THE DRAWINGS

Exemplary features and advantages of the present invention will become apparent from the following detailed description when taken with the accompanying drawings in which:

FIG. 16 is an example of a relation between the noise figure and the input signal level of the optical amplifier 201 and the optical amplifier 911; and.

EXEMPLARY EMBODIMENT

Exemplary embodiments of the present invention will now be described in detail in accordance with the accompanying drawings.

The First Exemplary Embodiment

Figure 1:
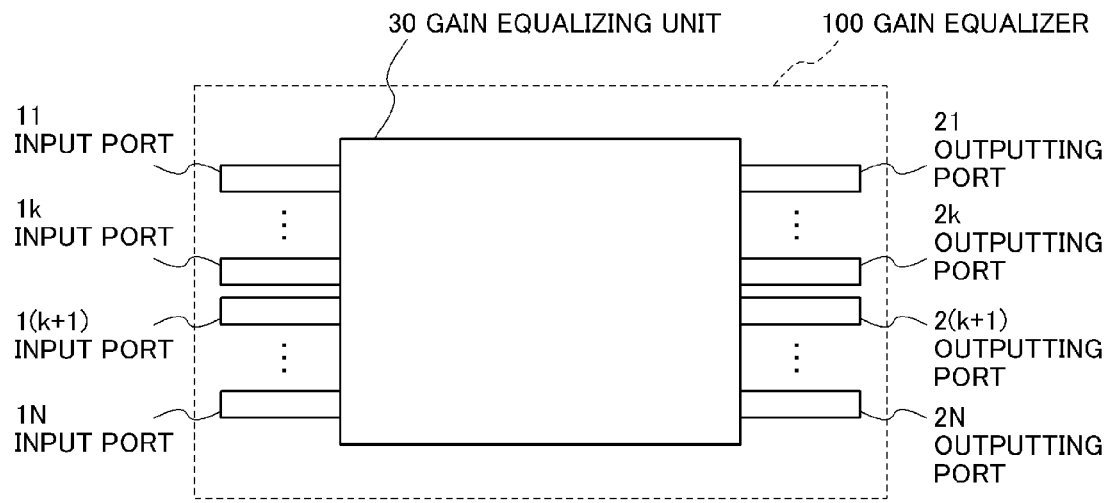
FIG. 1 is a schematic configuration diagram of a gain equalizer 100 according to a first exemplary embodiment of the present invention.

A gain equalizer according to a first exemplary embodiment of the present invention will be described. A schematic configuration diagram of a gain equalizer 100 according to a first embodiment is shown in FIG. 1. In FIG. 1, the gain equalizer 100 includes parallel N (first to N-th) input ports 11-1N, parallel N (first to N-th) outputting ports 21-21N, and a gain equalizing units 30. Here, N is an integer which is 2 or more.

The first to N-th input ports 11-1N can be generally called an input part. Each of the input ports 11-1N receives a WDM optical signal and sends the WDM optical signal to the gain equalizing unit 30. The first to N-th outputting ports 21-2N can be generally called an outputting part. The WDM optical signal is output from the gain equalizing unit 30 via each of the outputting ports 21-2N.

Here, each of the outputting ports 21-2N of the gain equalizer 100 corresponds to each of the input ports 11-1N respectively. For example, an outputting port 21 corresponds to an input port 11, and an outputting port 2N corresponds to an input port 1N. Moreover, each of the first to (N−1)-th outputting ports 21-2 (N−1) is connected with the second to N-th input ports 12-1N respectively. Then, the WDM optical signal enters the first input port 11, passes through the second to N-th input ports 12-1N, the first to (N−1)-th outputting ports 21-2 (N−1) and the gain equalization unit 30, and outputs from the N-th outputting port 2N.

The gain equalization unit 30 is set a loss characteristic which is allocated for each wavelength included in a transmission band of a WDM optical signal in which a plurality of optical signals each having a different wavelength is multiplexed and transmitted. The gain equalizing unit 30 is set a loss which is smaller than a loss characteristic required for compensation a variation of loss among the optical signals in the WDM optical signal. In the first embodiment, the gain equalizing unit 30 is set 1/N of a loss characteristic required for compensation a variation of loss among the optical signals in the WDM optical signal, that is, 1/N of the loss characteristic required for loss compensation. Here, N is the number of each of the input ports and the outputting ports.

Next, operation of the gain equalizer 100 will be described. In FIG. 1, a WDM optical signal entered the gain equalization unit 30 of the gain equalizer 100 via an input port 1$i$ ($i$=1, 2, ..., k, (k+1), ..., N: $i$ is an integer) is given the loss characteristic which is set to the gain equalization unit 30 (hereinafter, just referred to as "giving of a loss"), and is output from an outputting port 2$i$. The WDM optical signal output from each of the first to (N−1)-th outputting ports 21-2 (N−1) is entered each of the second to N input ports 12-1N respectively, and is therefore given the loss characteristic N times before output from N-th outputting port 2N.

That is, in the gain equalizer 100 including N input ports, N outputting ports and the gain equalizing units 30, the WDM optical signal received by the input port 11 enters the gain equalizing unit 30 N times and is given of the loss N times by the gain equalizing unit 30, that is, the WDM optical signal is given a loss characteristic required for compensation a variation of loss among the optical signals in the WDM optical signal. Then, the variation of loss among the optical signals in the WDM optical signal is compensated.

As mentioned above, the gain equalizer 100 according to the first embodiment can give the loss characteristic set to the gain equalizing unit 30 N times to the WDM optical signal. Even when a loss characteristic required for loss compensation is large, 1/N thereof can be set to the gain equalizing unit 30.

Since the loss characteristic set to the gain equalizing unit 30 in the gain equalizer 100 can be made small, the gain equalizing unit 30 can be simply manufactured, accordingly the low-cost gain equalizer 100 can be provided.

In the gain equalizer 100 according to the first embodiment, if the WDM optical signal includes no feedback to the gain equalizing unit 30, the loss characteristic set to the gain equalizing unit 30 is given to the WDM optical signal directly. Accordingly, the gain equalizer 100 can correspond to a plurality of loss characteristics, and include high flexibility.

The Second Exemplary Embodiment

A gain equalizer according to a second exemplary embodiment of the present invention will be described. A schematic configuration diagram of a gain equalizer 100$b$ according to the second embodiment is shown in FIG. 2.

Figure 2:
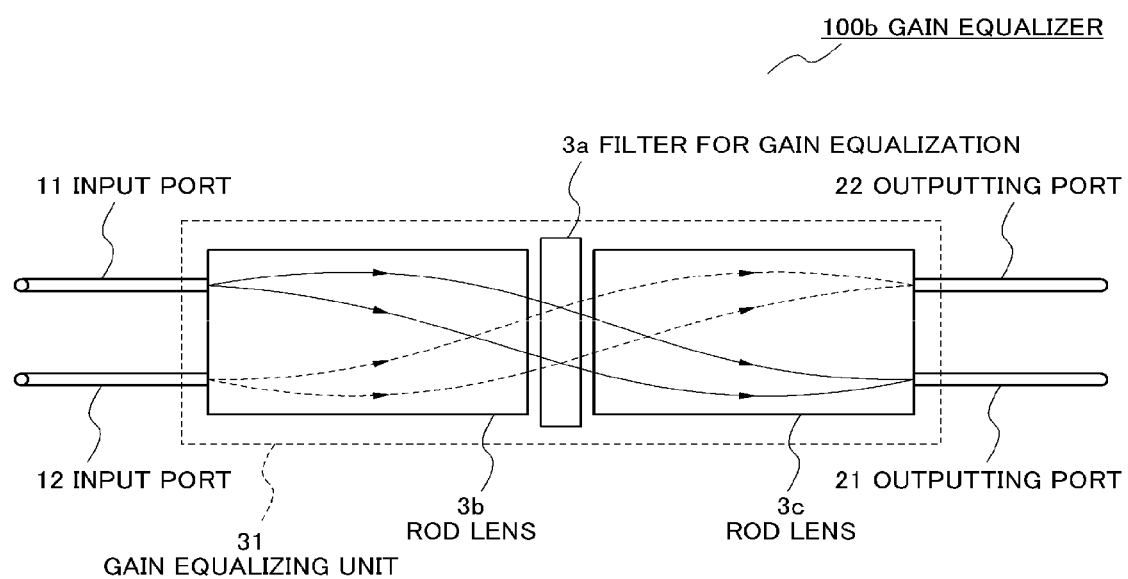
FIG. 2 is a schematic configuration diagram of a gain equalizer 100b according to a second exemplary embodiment of the present invention.

In FIG. 2, the gain equalizer 100$b$ includes two input ports 11, 12, two outputting ports 21, 22 and a gain equalizing unit 31. Since the two input ports 11, 12 and the two outputting ports 21, 22 are the same as those of the gain equalizer 100 according to a first embodiment, detailed descriptions thereof is omitted.

In the second embodiment, the gain equalizing unit 31 includes a filter 3a for gain equalization and rod lenses 3b and 3c.

The filter 3a is set a loss which is smaller than a loss characteristic required for compensation a variation of loss among the optical signals in the WDM optical signal. In the second embodiment, the filter 3a is set a loss characteristic of ½ of the loss characteristic required for compensation a variation of loss among the optical signals in the WDM optical signal, that is, ½ of a loss characteristic required for loss compensation. The loss characteristic of the filter 3a may be configured fixedly at the time of manufacture thereof or before the input ports 11 and 12 receive the WDM optical signal. As the filter 3a, for example, a dielectric multilayer film filter device, an optical isolate device or a fiber grating (FBG) device can be used.

The rod lens 3b, 3c can generally be called an optical member. Refractive indices of the rod lenses 3b, 3c become small in a parabolic shaped manner toward the outside of the lens from an optical axis center of the lens. A WDM optical signal received by each of input ports 11, 12 passes through the rod lens 3b, the filter 3a and the rod lens 3c, and is sent to the outputting port corresponding to the input ports 21, 22.

In FIG. 2, the WDM optical signal received by the input port 11 enters the filter 3a through the rod lens 3b. Then, a loss of ½ of a loss characteristic required for loss compensation is given to the WDM optical signal. The WDM optical signal given the loss is sent to the outputting port 21 through the rod lens 3c.

The WDM optical signal output from the outputting port 21 enters the filter 3a again from the input port 12 and the loss is given thereto once more. That is, the loss characteristic required for loss compensation is given to the WDM optical signal by twice entering to the filter 3a. The WDM optical signal given the loss required for loss compensation is output to outside of the gain equalizer 100b via the outputting port 22.

According to the above configuration of the gain equalizing unit 31, the loss characteristic of the filter 3a can be set to be a loss of ½ of the loss characteristic required for compensation a variation of loss among the optical signals in the WDM optical signal. Since the loss characteristic of the filter 3a can set small, the filter 3a can be readily manufactured and the low cost gain equalizer 100b can be provided.

The optical member is not limited to a rod lens and can be changed optionally. The gain equalizing unit 31 is not limited to the filter 3a for gain equalization, and can be changed optionally.

The Third Exemplary Embodiment

Figure 3:
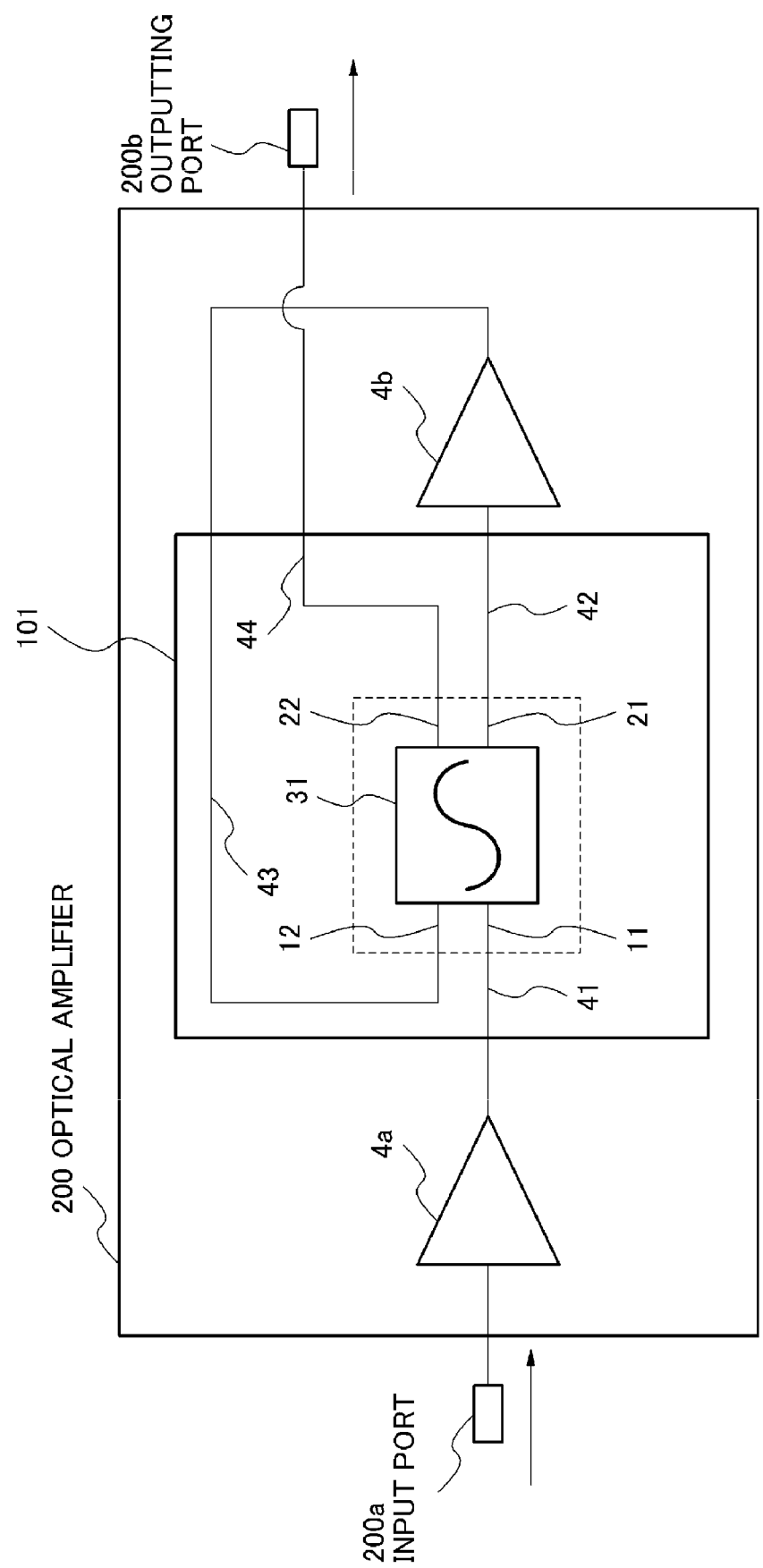
FIG. 3 is a block diagram of an optical amplifier 200 according to a third exemplary embodiment of the present invention.

An optical amplifier according to a third exemplary embodiment will be described. A block diagram of an optical amplifier 200 according to the third embodiment is shown in FIG. 3. In FIG. 3, the optical amplifier 200 includes a gain equalizer 101, an input port 200a, an outputting port 200b and two optical amplification units 4a, 4b.

The gain equalizer 101 is similar to the gain equalizer 100b according to the second embodiment. The part that corresponds to the gain equalizer 100b of the gain equalizer 101 is enclosed with the dotted line in FIG. 3. In the third embodiment, the gain equalizer 101 is required for compensation a variation of gain among optical signals generated by amplification in the optical amplification units 4a, 4b. The gain equalizing unit 31 is set a loss which is smaller than a loss characteristic required for compensation the variation of gain. The gain equalizing unit 31 of the gain equalizer 101 is set a loss of ½ of a loss characteristic which is opposite of wavelength dependency of gain of the optical amplification units 4a, 4b (hereinafter, described as "a loss of ½ of a request loss characteristic"). The gain equalizer 101 according to the third embodiment includes optical transmission parts 41-44. In FIG. 3, the optical transmission part 41 transmits the WDM optical signal amplified by the optical amplification unit 4a to the input port 11 of the gain equalizer 101. The optical transmission part 42 transmits the WDM optical signal output from the outputting port 21 to the optical amplification unit 4b. The optical transmission part 43 transmits the WDM optical signal amplified by the optical amplification unit 4b to the input port 12. The optical transmission part 44 transmits the WDM optical signal with the loss output from the outputting port 22 to the outputting port 200b.

The input port 200a sends the WDM optical signal to the optical amplifier 200. The outputting port 200b outputs the WDM optical signal which is amplified by optical amplification units 4a and 4b and is given the request loss characteristic by the gain equalizer 101.

Each of the optical amplification units 4a, 4b includes an EDF (Erbium-doped Fiber), an exciting LD (laser diode) and a WDM coupler, and has a wavelength dependency in amplifying characteristic. When a core of a rare earth doped optical fiber of each of the optical amplification units 4a, 4b is passed by an optical signal and an excitation light, intensity of the optical signal is amplified. As the optical amplification units 4a, 4b, the optical signal may be amplified by an excitation light input a second clad part of a double clad fiber. Since the optical amplification units 4a, 4b are known well for a person skilled in the art, descriptions of a detailed configuration of the optical amplification units 4a, 4b are omitted.

Next, operation of the optical amplifier 200 will be described. In FIG. 3, a WDM optical signal is entered from the input port 200a of the optical amplifier 200. In the third embodiment, the WDM optical signal includes a plurality of the optical signals in L-band (1570-1610 nm).

First, the WDM optical signal enters the optical amplification unit 4a. The WDM optical signal amplified by the optical amplification unit 4a enters the gain equalizing unit 31 of the gain equalizer 101 via the optical transmission part 41 and the input port 11. Passing through the gain equalizing unit 31, the WDM optical signal is given a loss of ½ of a request loss characteristic.

The WDM optical signal given the loss is output from the outputting port 21 of the gain equalizer 101 and is sent to the optical amplification unit 4b via the optical transmission part 42. The WDM optical signal amplified by the optical amplification unit 4b is sent to the gain equalizing unit 31 again via the optical transmission part 43 and the input port 12.

When the WDM optical signal passes through the gain equalizing unit 31 again, a second giving of the loss is performed thereto. By giving of the loss twice, the WDM optical signal is given the loss characteristic which is opposite of the wavelength dependency of gain of the optical amplifier 200, that is, the required loss characteristic, and the gain of the WDM optical signal is flattened. The flattened WDM optical signal is output from the outputting port 22 of the gain equalizer 101, and is output to the outside of the optical amplifier 200 via the optical transmission part 44 and the outputting port 200b.

Relations among a WDM optical signal entering the optical amplifier 200, a WDM optical signal output therefrom and a loss characteristic set to the gain equalizer 101 will be described using FIGS. 4-7.

Figure 4:
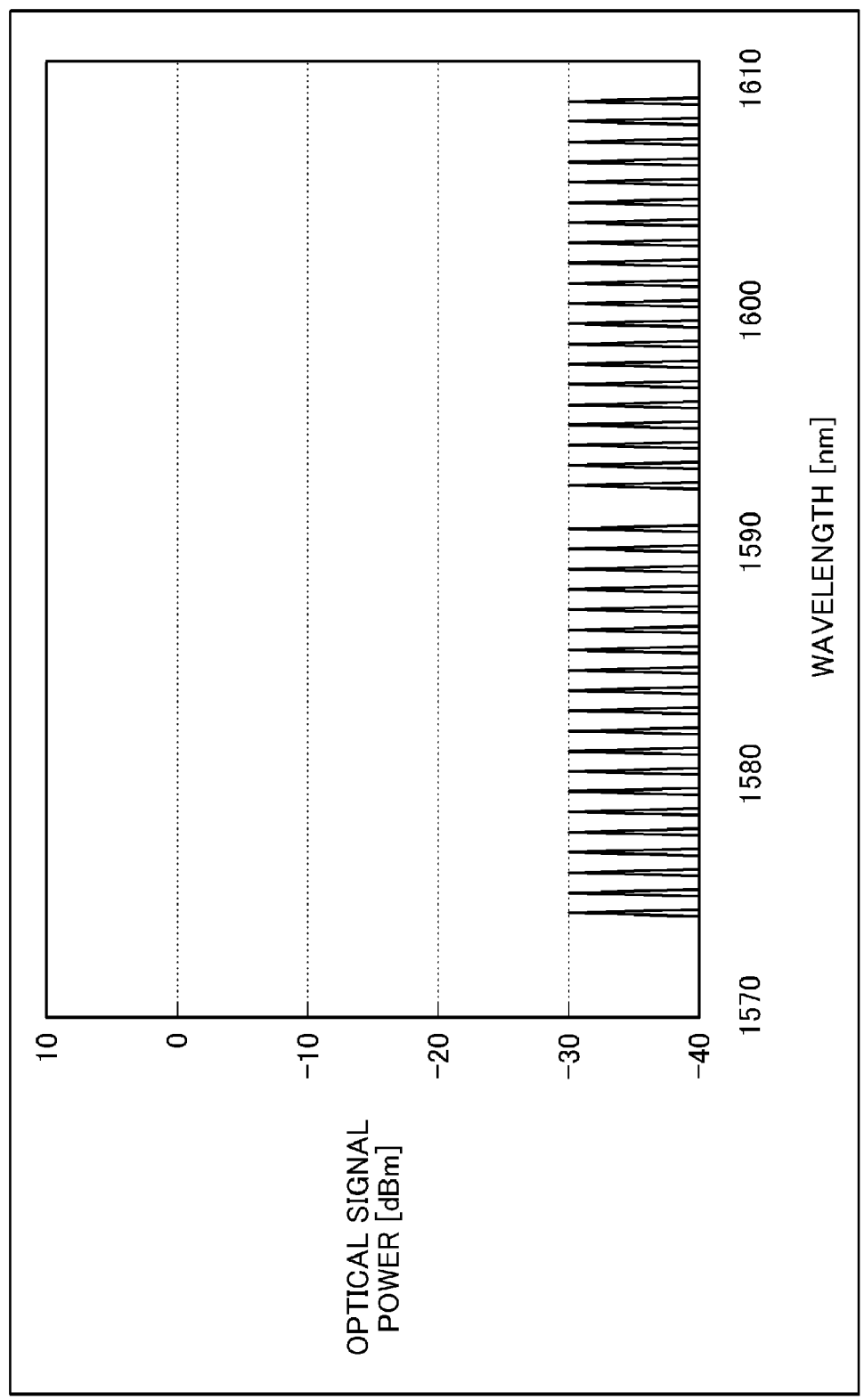
FIG. 4 is an example of a signal spectrum input to the optical amplifier 200 according to the third exemplary embodiment of the present invention.

First, an example of a signal spectrum of the WDM optical signal entering the optical amplifier 200 is shown in FIG. 4. As shown in FIG. 4, 40 waves formed by the optical signals of −30 dBm/ch each having a different wavelength enter the optical amplifier 200.

Figure 5:
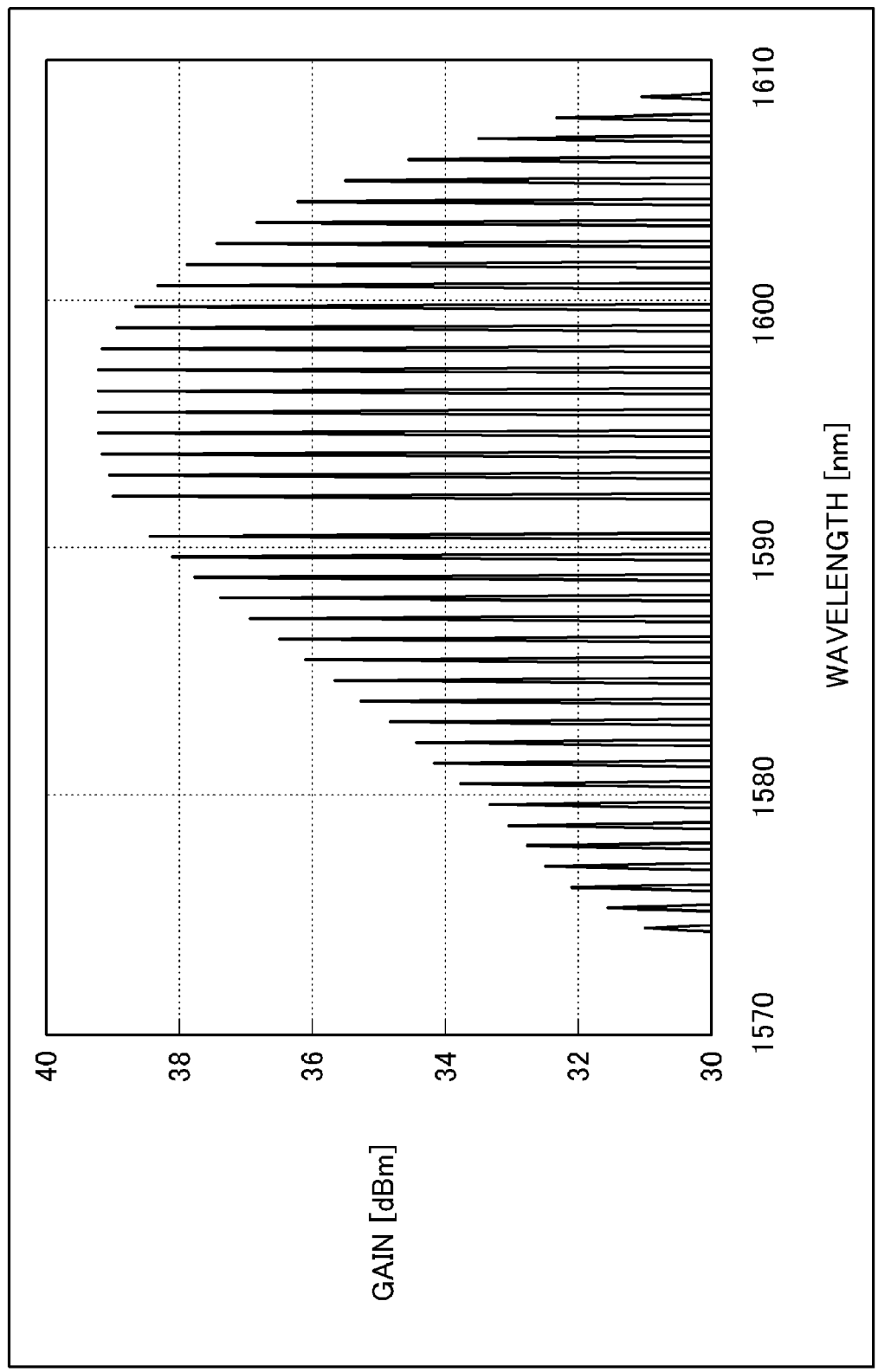
FIG. 5 shows an example of a gain spectrum of an optical signal output from the optical amplifier 200 when gains do not flatten.

FIG. 5 is an example of a gain spectrum in a transmission band of the WDM optical signal output from the optical amplifier 200 without flattening by the gain equalizer 101. When the flattening is not performed, the wavelength dependency of the gain of the amplified WDM optical signal arises in the transmission band. That is, in FIG. 5, gain difference of about 8.0 dB arises between a gain in nearly 1575 nm and a gain in nearly 1595 nm of the WDM optical signal in the L-band.

Figure 6:
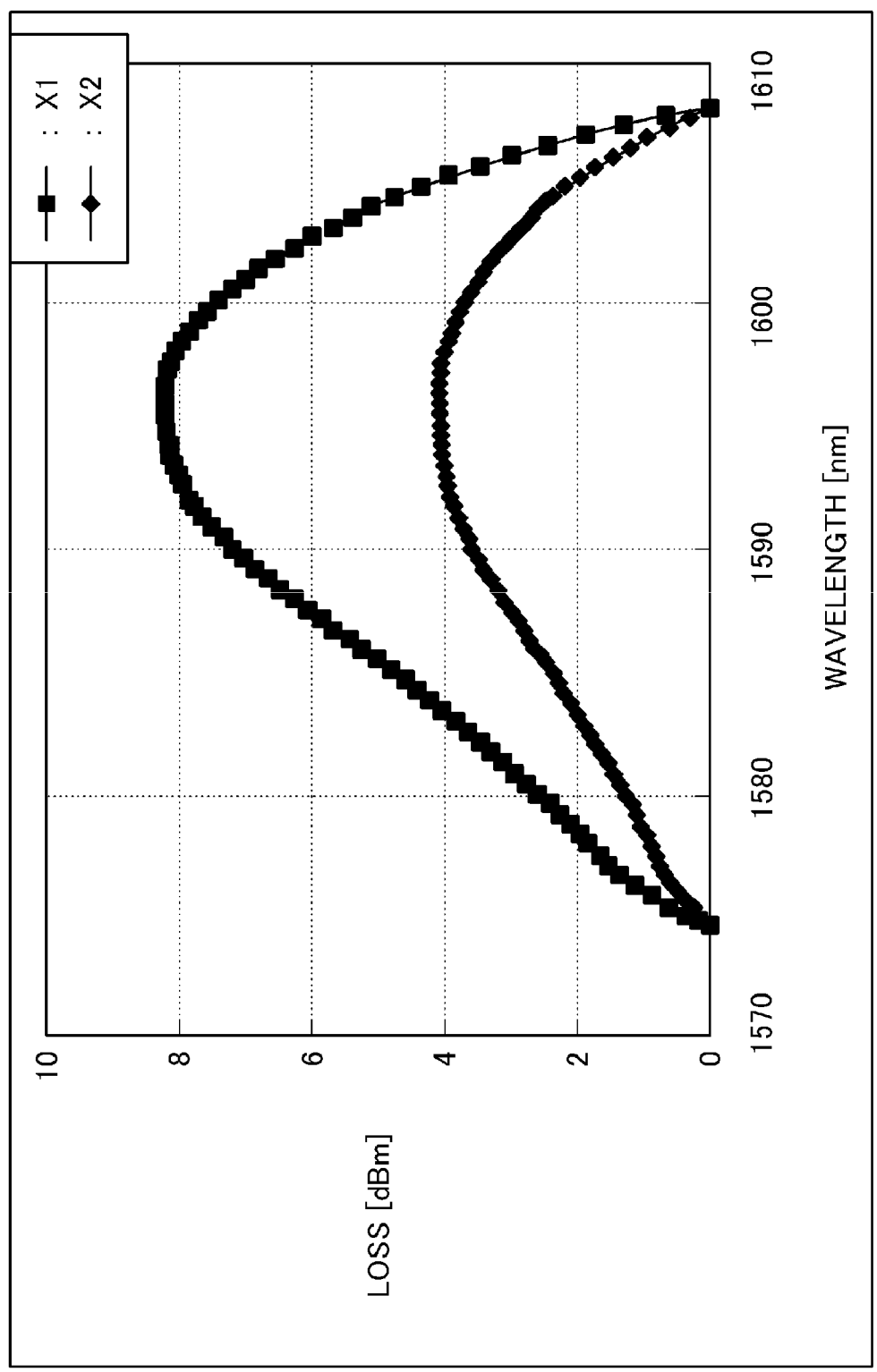
FIG. 6 shows examples of a request loss characteristic of the gain equalizer 101 and a loss characteristic of the gain equalization unit 31 according to the third exemplary embodiment of the present invention.

In FIG. 6, X1 is an example of a loss characteristic which is opposite of the gain spectrum in FIG. 5, that is, the request loss characteristic of the gain equalizer 10. In FIG. 6, X2 is an example of a loss characteristic set to the gain equalizing unit 31, that is, a loss of ½ of the request loss characteristic X1. In the third embodiment, the number of each of the input ports and the outputting ports in the gain equalizer 101 is 2 (i.e. N=2), and the loss characteristic of ½ of X1 is set to the gain equalizing unit 31, as X2.

Figure 7:
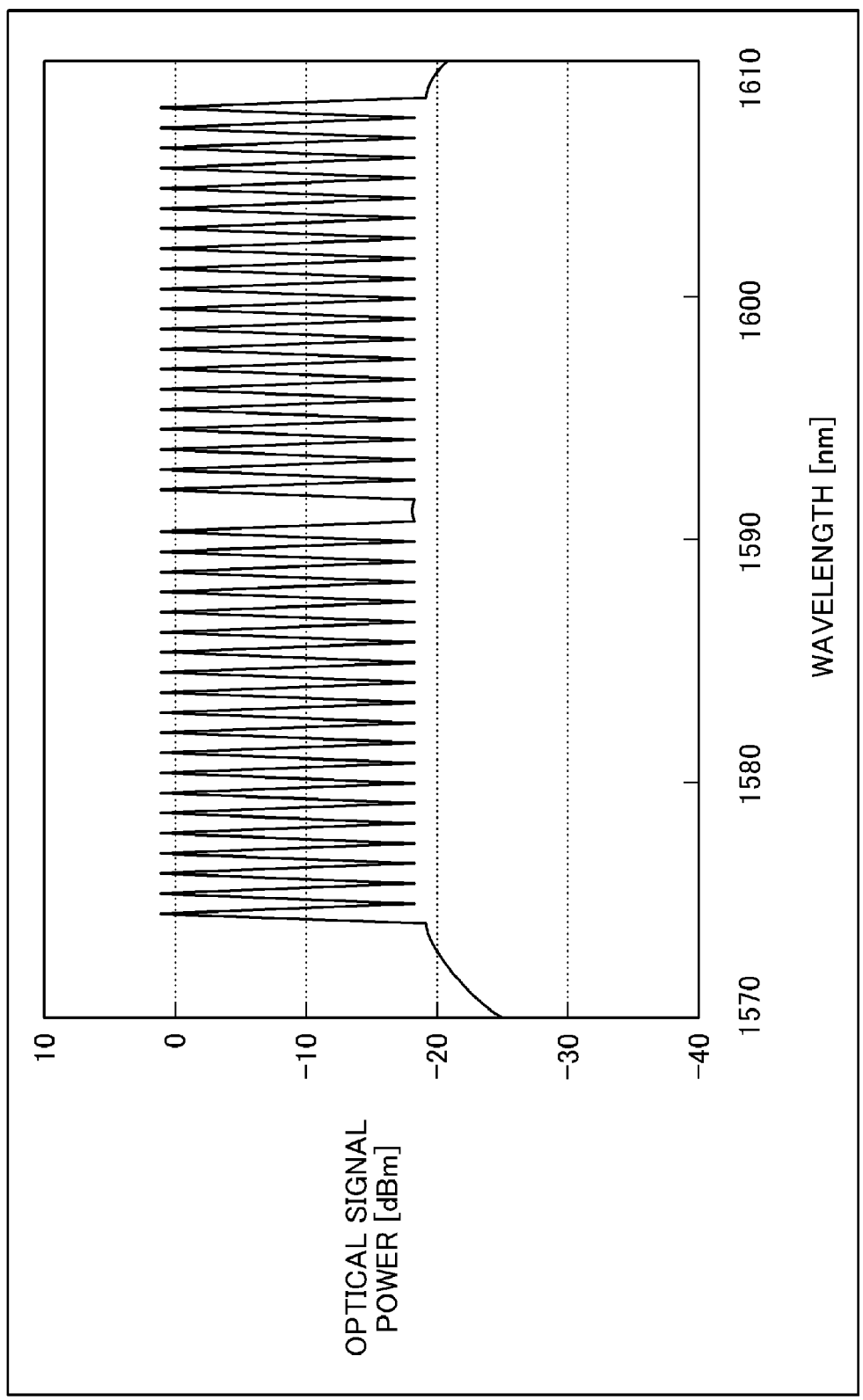
FIG. 7 is an example of a signal spectrum output from the optical amplifier 200 according to the third exemplary embodiment of the present invention.

FIG. 7 is an example of a spectrum of a WDM optical signal output from the optical amplifier 200. When 40 waves formed by the optical signal of −30 dBm/ch (channel) are amplified by the amplifiers 4a, 4b, 40 waves of +1 dBm/ch are output from the optical amplifier 200. In FIG. 7, the output WDM optical signal is flattened by the gain equalizer 101.

Here, in the third embodiment, the gain equalizer 101 includes two input ports and two outputting ports. However, the gain equalizer 101 can includes more than two input ports and more than two outputting ports.

The optical amplifier 200 includes two optical amplification units 4a, 4b in the third embodiment. In other case, the optical amplifier 200 can include one optical amplification unit, or more than two optical amplification units. The optical amplification method in the optical amplification units 4a, 4b is not restricted to the optical amplification method using the EDF.

In the third embodiment, the WDM optical signal including a plurality of the optical signals in L-band (1570-1610 nm) is entered to the optical amplifier 200. Specifically, the WDM optical signal includes 40 waves of −30 dBm/ch. However, the transmission band and the number of the optical signals are not limited to these values.

As described above, in the third embodiment, the WDM optical signal passes through the gain equalizing unit 31 twice and is given the loss set to the gain equalizing unit 31 twice, so the WDM optical signal is given the loss characteristic which is opposite of wavelength dependency of gain of the optical amplification units 4a and is flattened.

Accordingly, compared with an optical amplifier in which two gain equalizers combined in series for flattening, the optical amplifier 200 according to the third embodiment can reduce the number of components and becomes low-cost.

The optical amplifier 200 in the third embodiment performs amplification by the optical amplification units 4a, 4b and flattening by the gain equalizer 101 repeatedly. Thereby, the optical amplifier 200 can prevent a loss of an optical signal having arbitrary wavelength from increasing locally, and can prevent heat generation and deterioration caused by the locally increased of loss. Because the optical amplifier 200 can reduce a loss given by once giving a loss, it can be avoided that the optical signal having arbitrary wavelength in the WDM optical signal is given a large loss intensively and a noise figure deteriorates caused by local deterioration of the loss of the optical signal.

Figure 8:
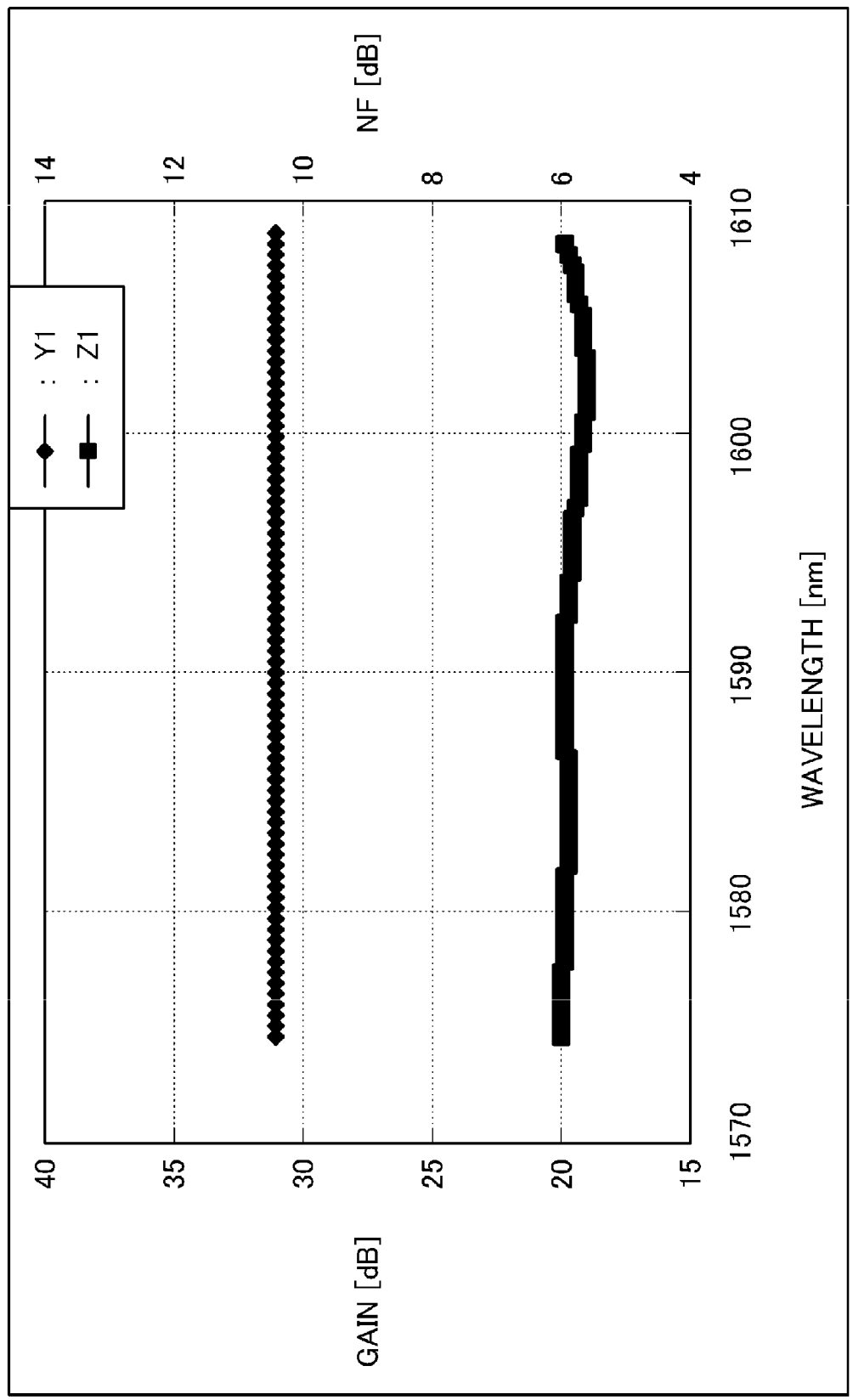
FIG. 8 is examples of an optical signal gain and a noise figure of the optical amplifier 200 according to the third exemplary embodiment of the present invention.

FIG. 8 is examples of an optical signal gain profile Y1 and a noise figure (NF) Z1 of the optical amplifier 200 according to the third embodiment. As mentioned above, while the signal levels of the optical signals in the input WDM optical signal are −30 dBm/ch, the signal levels thereof are +1 dBm/ch. So, the gain is 31 dB (Y1 of FIG. 8). In FIG. 8, the NF value is about 6.0 dB (refer to Z1 of FIG. 8).

Figure 9:
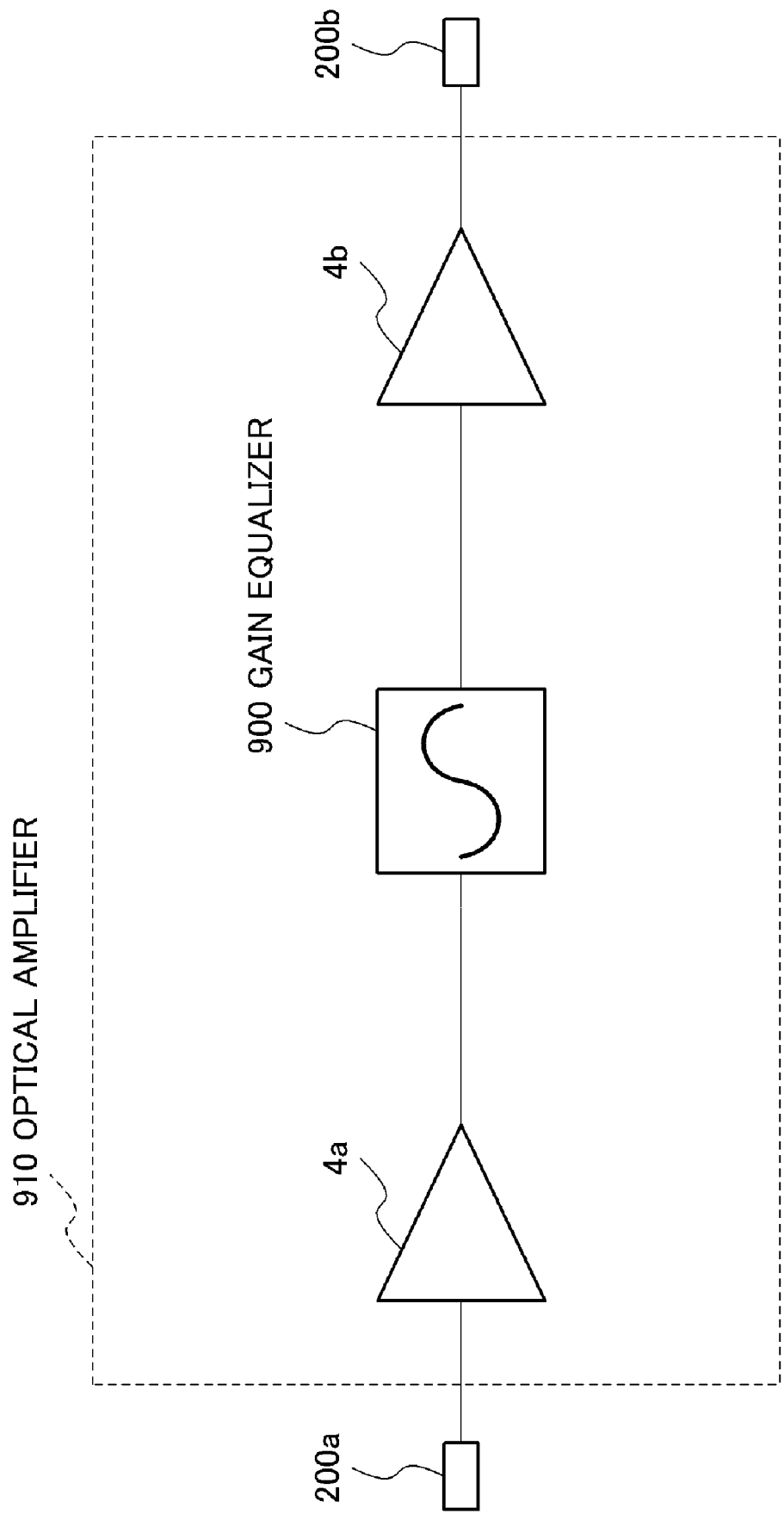
FIG. 9 is a block diagram of an optical amplifier 910 of a first reference embodiment.

Next, the noise figure is considered. FIG. 9 shows an optical amplifier 910 using a gain equalizer 900 having one input port and one outputting port as a first reference embodiment. In FIG. 9, the same code is given to the same part as that of FIG. 3. The loss characteristic set to the gain equalizer 900 is equivalent to the request loss characteristic (X1 of FIG. 6) of the above-mentioned gain equalizer 101.

When 40 waves formed by the optical signals of −30 dBm/ch shown in FIG. 4 enter an input port 200a of the optical amplifier 910 and pass through the gain equalizer 900 once, a loss of 8.0 dB or less is given thereto. Because flattening thereof is performed at one time, an optical signal having arbitrary wavelength in the transmission band is given a large loss intensively In generally, the larger a loss becomes, the more easily an optical signal is influenced by noise. When an optical signal having a large loss is amplified, the optical signal is easily influenced by an ASE (amplified spontaneous emission) light. Therefore, when a local deterioration of the loss of the optical signal is caused, the noise figure deteriorates.

Figure 10:
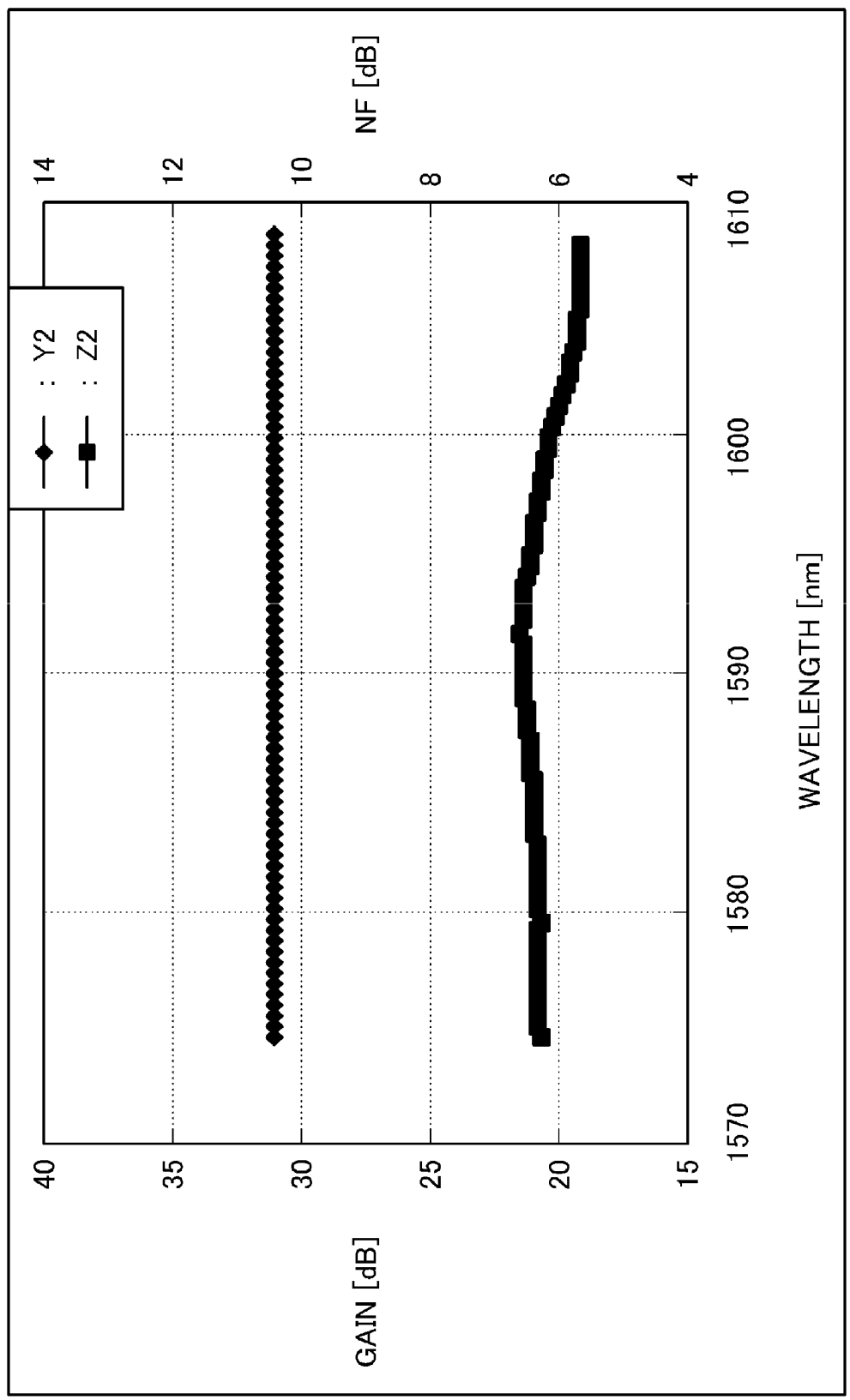
FIG. 10 is examples of an optical signal gain and a noise figure of the optical amplifier 910 of the first reference embodiment.

FIG. 10 shows an example of an optical signal gain profile Y2 and a noise figure Z2 of the optical amplifier 910 of the first reference embodiment. The gain of the optical amplifier 910 according to the first reference example (Y2 of FIG. 10) is the same 31 dB as the gain of the optical amplifier 200 according to the third embodiment (Y1 of FIG. 8). In contrast, NF value of the optical amplifier 910 degrades to 6.5 dB (Z2 of FIG. 10) compared with 6.0 dB of the optical amplifier 200 (Z1 of FIG. 8).

The Fourth Exemplary Embodiment

Figure 11:
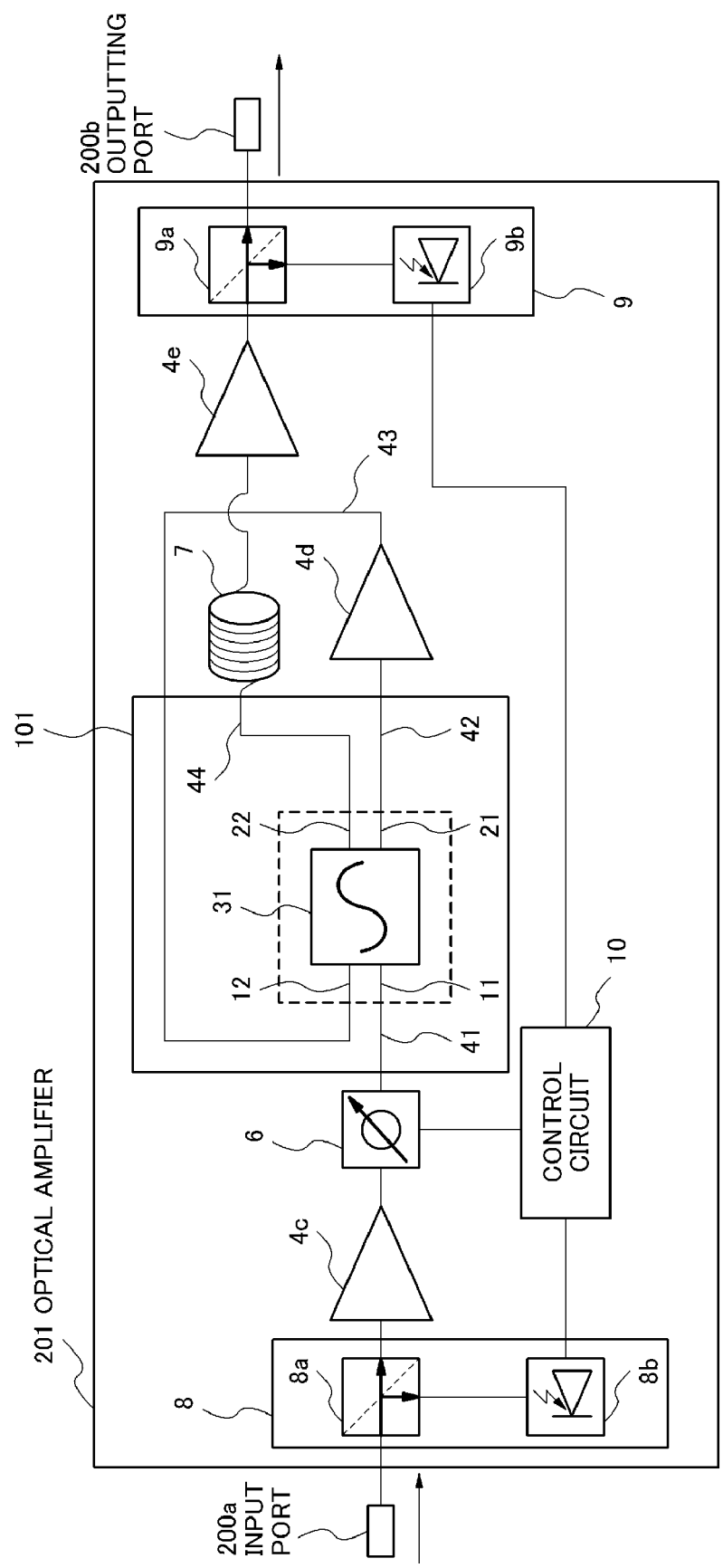
FIG. 11 is a block diagram of an optical amplifier 201 according to a fourth exemplary embodiment of the present invention.

An optical amplifier according to a fourth exemplary embodiment will be described. A block diagram of an optical amplifier 201 according to the fourth embodiment is shown in FIG. 11. In FIG. 11, the same code is given to the same part as that of the optical amplifier 200 (FIG. 3) according the third embodiment.

In FIG. 11, the optical amplifier 201 includes a gain equalizer 101, an input port 200a, an outputting port 200b, three optical amplification units 4c-4e, a variable optical attenuator 6, a dispersion compensation fiber (DCF) 7, a detection circuit 8, a detection circuit 9 and a control circuit 10.

Since the gain equalizer 101, the input port 200a, and the outputting port 200b are the same as that of the optical amplifier 200 according to the third embodiment, detailed descriptions are omitted. In the fourth embodiment, in the gain equalizing unit 31 of the gain equalizer 101 is set a loss of ½ of a loss characteristic which is opposite of wavelength dependency of gain of the optical amplification units 4c-4e, that is, a loss of ½ of a request loss characteristic.

In FIG. 11, the optical amplification unit 4c is located at a first stage (at a front stage), the optical amplification unit 4d is located at a subsequent stage of the optical amplification unit 4c, and the optical amplification unit 4e is located at a subsequent stage of the optical amplification unit 4d (at a final stage). Here, gain of the optical amplifier 201 according to the fourth embodiment is equivalent to gain of the optical amplifier 200 according to the third embodiment. That is, total gain of the optical amplification units 4c-4e is the same 31 dB as that of the optical amplification units 4a, 4b according to the third embodiment.

The variable optical attenuator 6 can generally be called an attenuation unit. The variable optical attenuator 6 attenuates a signal level of an optical signal being to enter the optical transmission part 41 based on attenuation which the control circuit 10 determines, and adjusts the signal level thereof. In FIG. 11, the optical signal of which the signal level is adjusted by the variable optical attenuator 6 enters the gain equalizer 101.

The DCF 7 is an optical fiber with normal dispersion (dispersion value is negative), and compensates wavelength dispersion. In FIG. 11, the DCF 7 compensates wavelength dispersion of a WDM optical signal output from the gain equalizer 101. The dispersion compensated WDM optical signal is sent into the optical amplification unit 4e.

The detection circuit 8 includes an optical branch coupler 8a and a PD (photodiode) module 8b. The detection circuit 8 can generally be called a first detection circuit. The detection circuit 8 detects a signal level of the optical signal which is to enter the optical amplification unit 4c of the first stage. The optical branching coupler 8a branches the detected optical signal at a predetermined ratio. One branched optical signal is sent to the optical amplification unit 4c and the other is sent to the PD module 8b. The PD module 8b receives the optical signal from the optical branch coupler 8a, converts it into an electric signal and outputs it to the control circuit 10. The converted electric signal indicates a signal level of the optical signal being to enter the optical amplification unit 4c.

The detection circuit 9 includes an optical branch coupler 9a and a PD module 9b. The detection circuit 9 can generally be called a second detection circuit. The detection circuit 9 detects a signal level of an optical signal output from the optical amplification unit 4e of the final stage. The optical branching coupler 9a branches the detected optical signal at a predetermined ratio, outputs one branched optical signal to the outputting port 200b as an output signal light, and outputs the other to the PD module 9b. The PD module 9b receives the optical signal from the optical branch coupler 9a, converts it into an electric signal and outputs it to the control circuit 10. The converted electric signal indicates a signal level of the optical signal output from the optical amplification unit 4e.

The control circuit 10 determines attenuation of the variable optical attenuator 6 based on the electric signals input by the detection circuit 8 and the detection circuit 9 so that the signal level of the optical signal being to output from the optical amplifier 201 becomes a predetermined value.

Then, operation of the optical amplifier 201 will be described. In FIG. 11, a WDM optical signal in L-band (1570-1610 nm) which is entered from the input port 200a of the optical amplifier 201 is successively propagated through the optical branching coupler 8a, the optical amplification unit 4c, the variable optical attenuator 6, the gain equalizer 101, the optical amplification unit 4d, the gain equalizer 101, the DCF 7 and the an optical amplification unit 4e. By passing through the optical amplification units 4c-4e, the WDM optical signal gets gain of 31 dB. By passing the gain equalizer 101 twice, the WDM optical signal is given a request loss characteristic and is flattened. By passing the DCF 7, the wavelength dispersion of the WDM optical signal is compensated.

Next, a case where a signal level of a WDM optical signal entered the optical amplifier 201 changes due to loss change in an optical transmission line or the optical amplifier 201 will be described. It is assumed that 40 waves formed by the optical signal of −20 dBm/ch are entered to the optical amplifier 201 due to the loss change in the optical transmission line.

Figure 12:
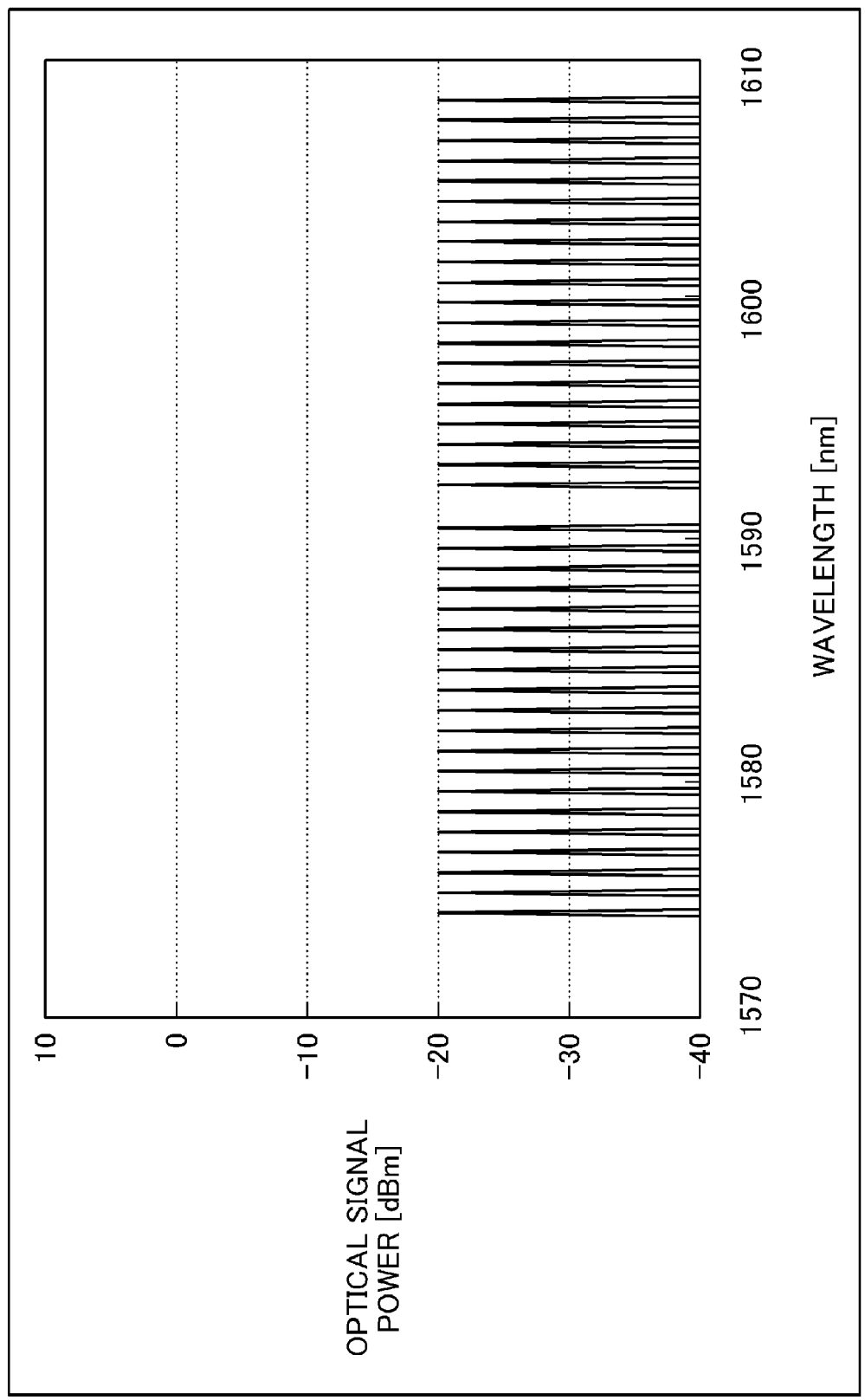
FIG. 12 shows an example of a signal spectrum with a changed loss input to the optical amplifier 201 according to a fourth exemplary embodiment of the present invention.

A signal spectrum of the entered WDM optical signal is shown in FIG. 12. The signal level (−20 dBm/ch) of FIG. 12 is 10 dB higher than the signal level (−30 dBm/ch) of the usual entered WDM optical signal shown in FIG. 4. Therefore, in order to keep the signal level of the output optical signal at +1 dB/ch, it is necessary to attenuate the signal level of the WDM optical signal shown in FIG. 12 by 10 dB.

In the optical amplifier 201 according to the fourth embodiment, the electric signal output from the PD module 8b changes according to change of the signal level of the entered WDM optical signal. When the variable optical attenuator 6 attenuates the entered WDM optical signal by 10 dB based on the amount of attenuation which the control circuit 10 determines, the signal level of the entered WDM optical signal becomes the same as the signal level before the change thereof. Accordingly, even when the signal level of the entered WDM optical signal changes, the signal level of the output WDM optical signal can be kept at +1 dB/ch.

Figure 13:
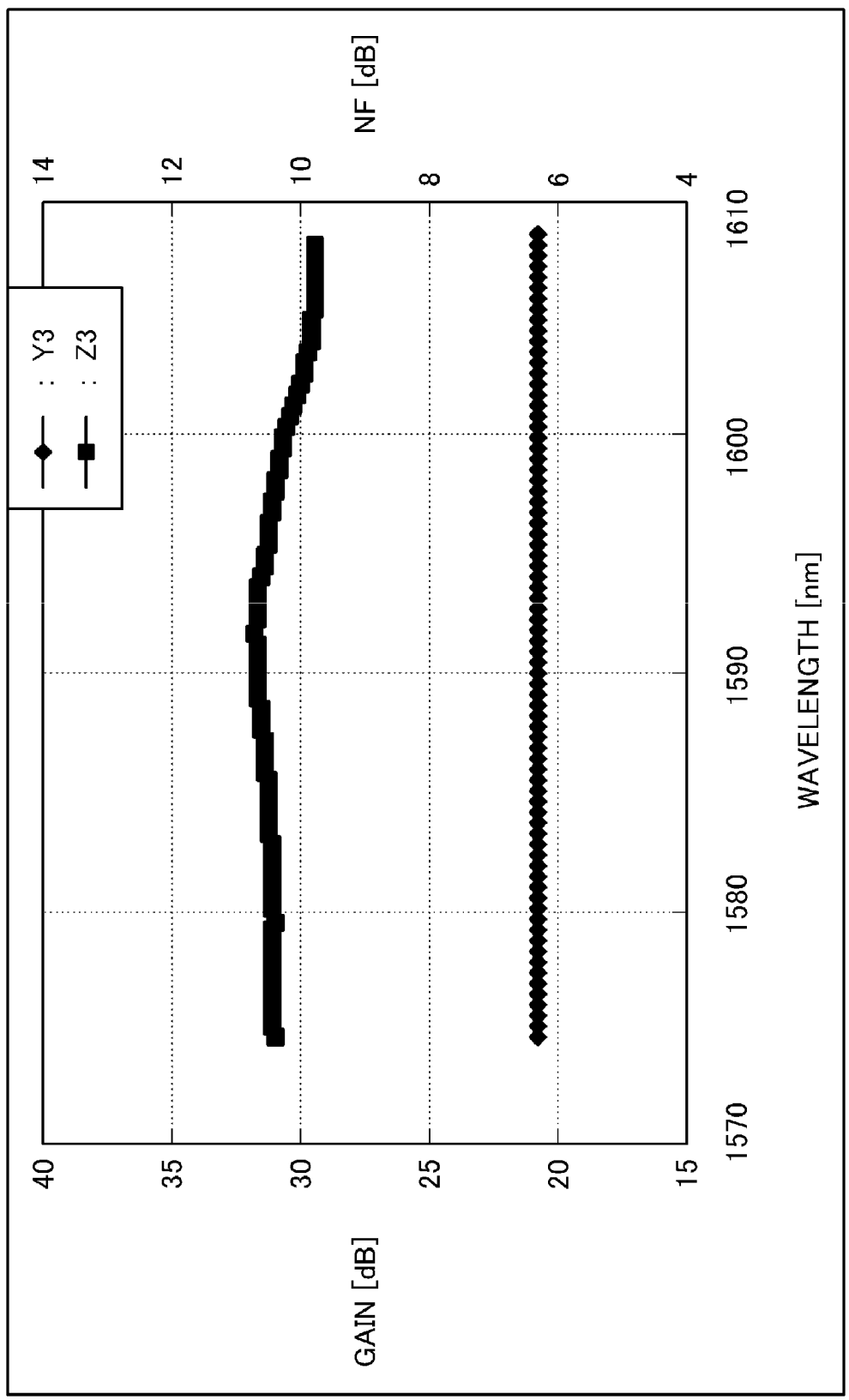
FIG. 13 shows examples of optical signal gain and a noise figure when the signal spectrum with a changed loss is input to the optical amplifier 201.

FIG. 13 shows the optical signal gain profile Y3 and the noise figure Z3 of the optical amplifier 201 when the WDM optical signal shown in FIG. 12 enters. In FIG. 13, 40 waves formed by the optical signal of −20 dBm/ch enter the input port 200a and 40 waves formed by the optical signal of +1 dBm/ch are output from the outputting port 200b, so the gain of the optical amplifier 201 is 21 dB (Y3 of FIG. 13).

On the other hand, the signal level of the entered WDM optical signal is attenuated by the variable optical attenuator 6 by 10 dB, so the NF value degrades by about 10.7 dB (Z3 of FIG. 13) from the initial value of 6 dB (Z1 of FIG. 8).

When the signal level of the WDM optical signal which is to send the outputting port 200b changes due to loss change in the optical transmission line or the optical amplifier 201, the electric signal output by the PD module 9b changes and the control circuit 10 determines the attenuation based on the change of the electric signal. When the variable optical attenuator 6 adjusts the signal level of the entered WDM optical signal based on the determined attenuation, the signal level of the output WDM optical signal is kept constant.

As mentioned above, the control circuit 10 determines the amount of attenuation of the variable optical attenuator 6 based on the detection result of the detection circuit 8 and the detection circuit 9 so that the signal level of the output WDM optical signal becomes constant, and the variable optical attenuator 6 attenuates the signal level of the entered WDM optical signal based on the determined attenuation. Therefore, even if a signal level of the WDM optical signal changes due to loss change in the optical transmission line or the optical amplifier 201, the signal level of the output WDM optical signal can be kept constant.

Figure 14:
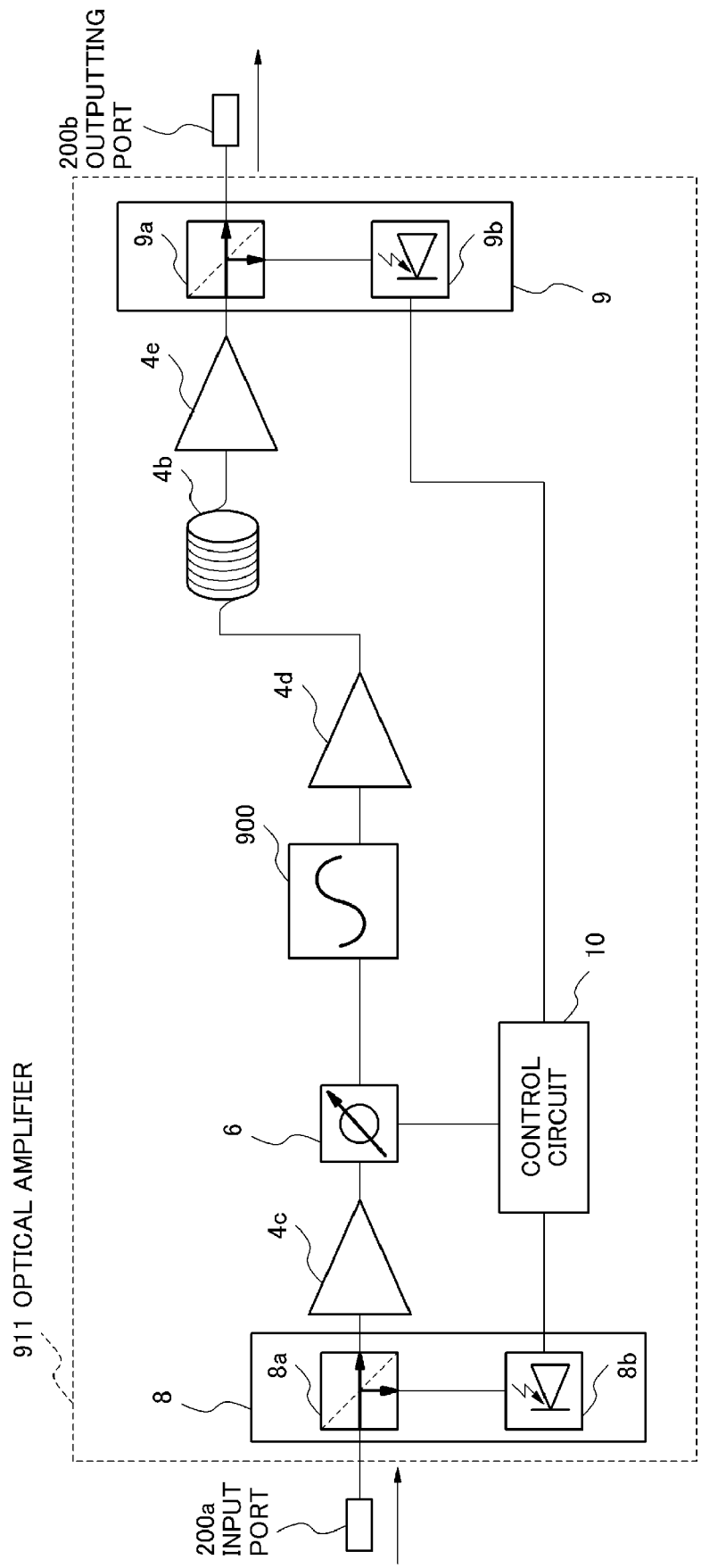
FIG. 14 is a block diagram of an optical amplifier 911 of a second reference embodiment.

FIG. 14 shows a block diagram of the optical amplifier 911 as a second reference embodiment. As shown in FIG. 14, the optical amplifier 911 includes a gain equalizer 900 having one input port and one outputting port. A case where a signal level of a WDM optical signal entered the optical amplifier 911 changes is considered as follows. Here, in FIG. 14, the same code is given to the same thing as that shown in FIG. 11.

The gain equalizer 900 of the second reference embodiment is the same as the gain equalizer 900 (FIG. 9) of the first reference embodiment described in the third embodiment. The loss characteristic of the gain equalizer 900 of the second reference embodiment is equivalent to the request loss characteristic (X1 of FIG. 6) of the gain equalizer 101 of the third embodiment and the fourth embodiment.

Figure 15:
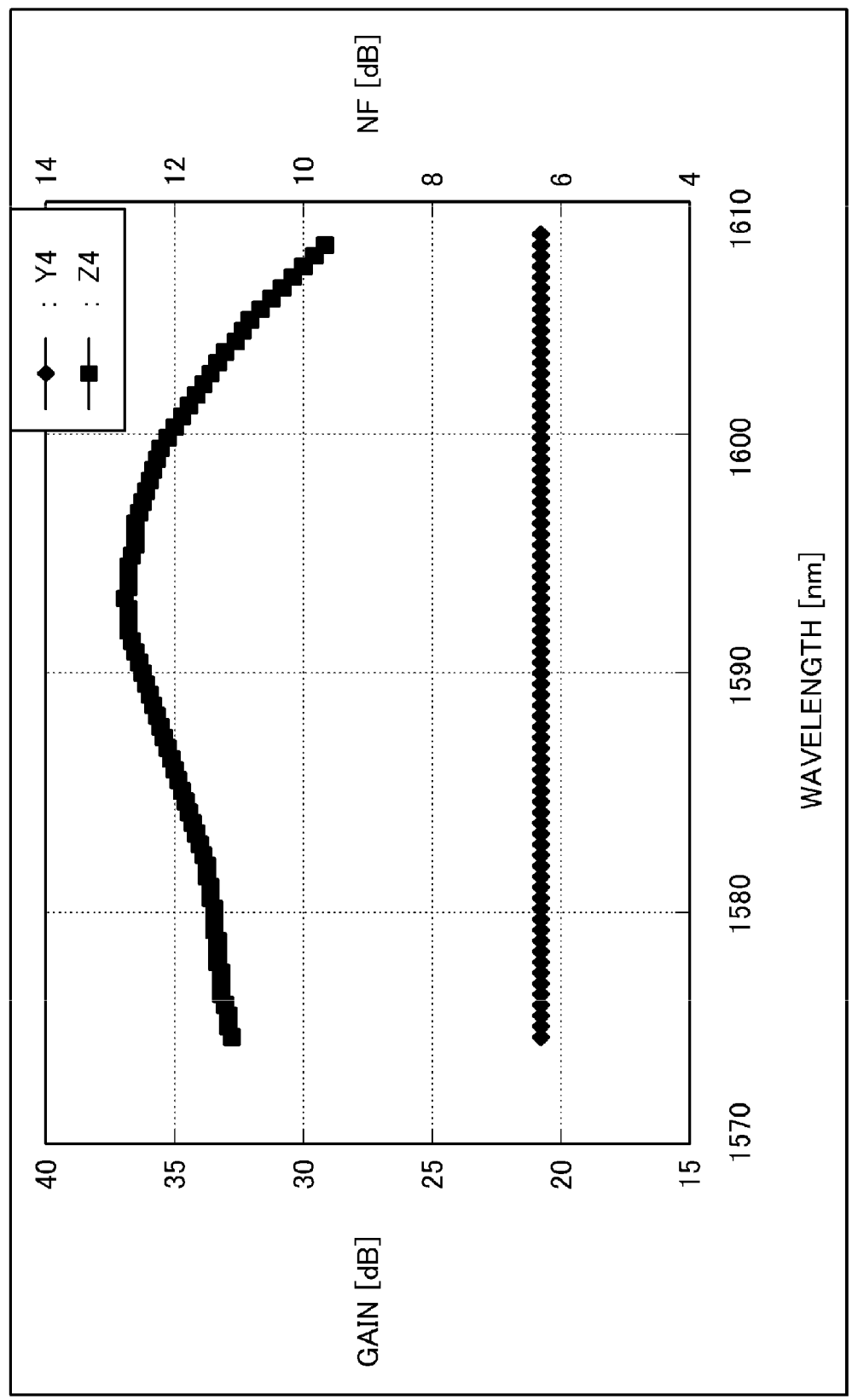
FIG. 15 is examples of an optical signal gain and a noise figure of the optical amplifier 911 of the second reference embodiment.

When 40 waves formed by the optical signal of −20 dBm/ch (FIG. 12) enter the optical amplifier 911, a control circuit 10 of the optical amplifier 911 attenuates the entered WDM optical signal by 10 dB using the variable optical attenuator 6. FIG. 15 shows examples of an optical signal gain profile Y4 and a noise figure Z4 of the optical amplifier 911 when the WDM optical signal shown in FIG. 12 enters the optical amplifier 911. When FIG. 15 is compared with FIG. 13, the gain of the optical amplifier 911 according to the second reference embodiment (Y4 of FIG. 15) is the same is 21 dB as the gain of the optical amplifier 201 according to the fourth embodiment (Y3 of FIG. 13). On the other hand, the NF value deteriorates from about 10.7 dB (Z3 of FIG. 13) of the optical amplifier 201 to about 13 dB (Z4 of FIG. 15) of the second reference embodiment. This is caused by that signal levels of optical signals of the WDM optical signal deteriorates by being attenuated from the variable optical attenuator 6, and an optical signal having arbitrary wavelength further deteriorates intensively by flattening.

Figure 16:
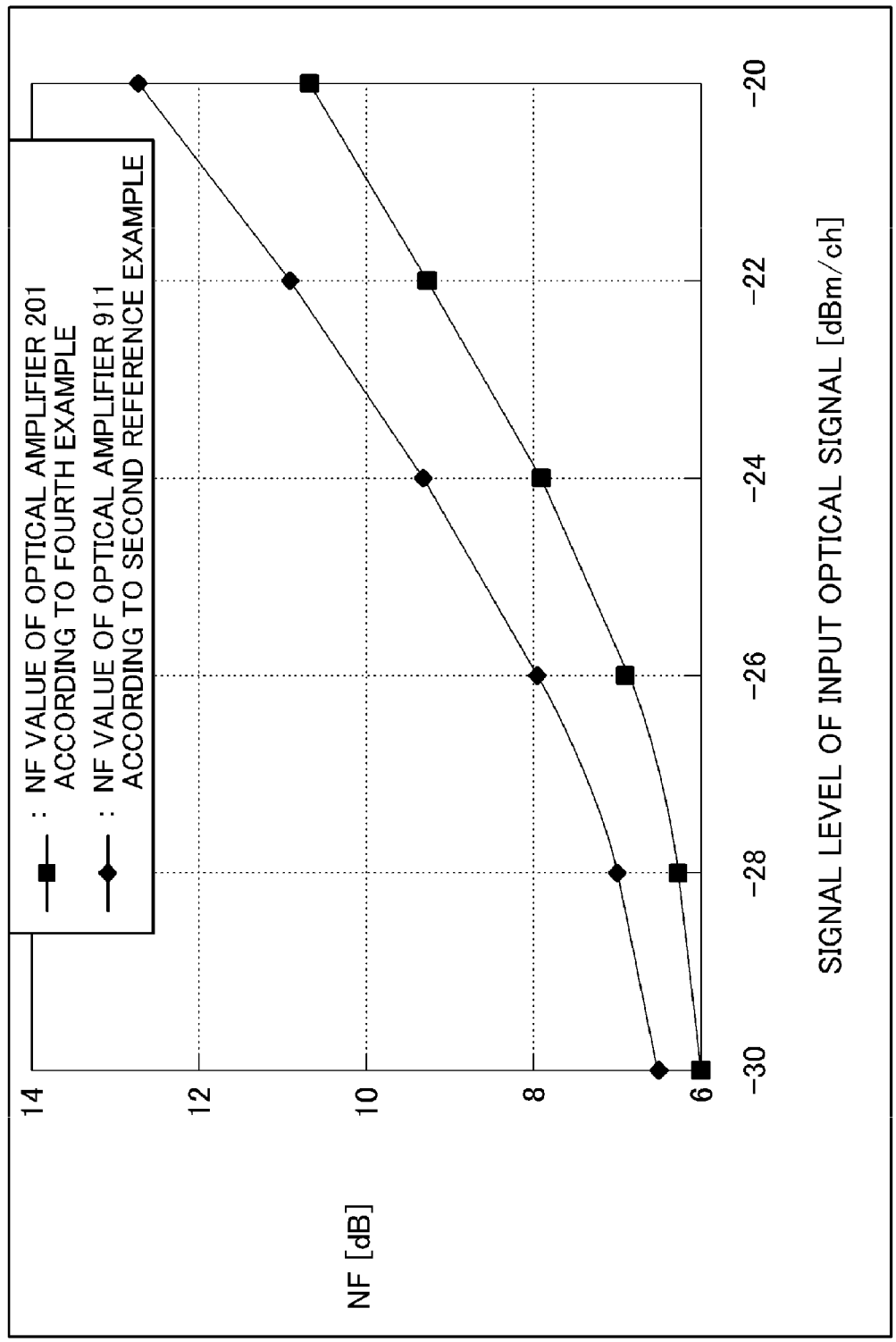

An example of a relation of the signal level and the NF value in an optical amplifier 201 of the fourth embodiment and the optical amplifier 911 of the second reference embodiment is shown in FIG. 16. In FIG. 16, when the NF value of the optical amplifier 201 is compared with that of the optical amplifier 911, the optical amplifier 201 is better in the NF value under all conditions. The tendency becomes more remarkable with increase of the signal level at the time of entry to the optical amplifier.

The Fifth Exemplary Embodiment

Figure 17:
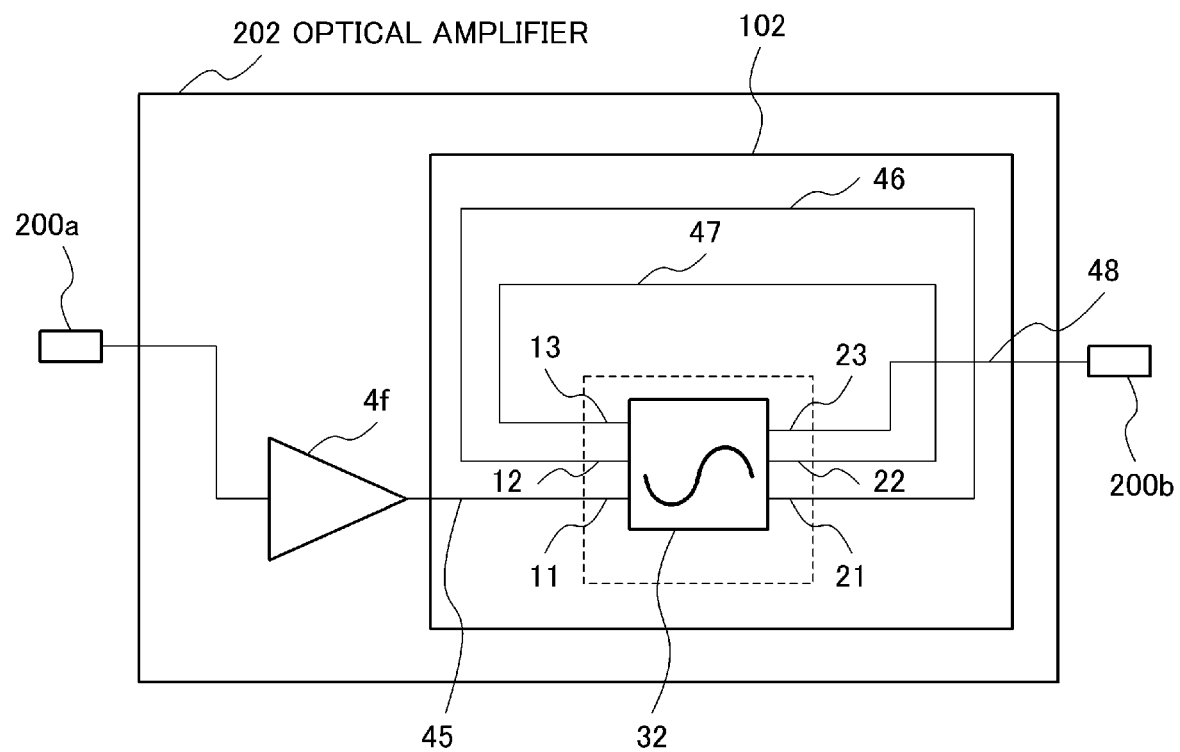
FIG. 17 is a block diagram of an optical amplifier 202 according to a fifth exemplary embodiment of the present invention.

A fifth exemplary embodiment will be described. FIG. 17 is a block diagram of an optical amplifier 202 according to the fifth embodiment. In FIG. 17, the optical amplifier 202 includes a gain equalizer 102, an optical amplification unit 4f, an input port 200a and an outputting port 200b.

The gain equalizer 102 includes three input ports 11, 12 and 13, three outputting ports 21, 22 and 23, a gain equalizing unit 32 and optical transmission parts 45-48. The gain equalizing unit 32 is set a loss of ⅓ of a loss characteristic which is opposite of wavelength dependency of gain of the optical amplification unit 4f, that is, a loss of ⅓ of a request loss characteristic.

When a WDM optical signal enters the optical amplifier 202, the WDM optical signal is amplified in the optical amplification unit 4f and enters the gain equalizing unit 32 via the optical transmission part 45 and the input port 11. The WDM optical signal is given the loss of ⅓ of a request loss characteristic by the gain equalizing unit 32 and is output from the outputting port 21. The WDM optical signal output from the outputting port 21 enters the gain equalizing unit 32 again via the optical transmission part 46 and the input port 12, and second giving a loss is performed and is output from the outputting port 22. The WDM optical signal output from the outputting port 22 is enters the gain equalizing unit 32 via the optical transmission part 47 and the input port 31, and third giving a loss is performed. By performing the giving a loss three times, the WDM optical signal is given the loss characteristic which is opposite of wavelength dependency of gain of the optical amplification unit 4f and the gain thereof is flattened. The WDM optical signal which is amplified by the optical amplification unit 4f and is flattened by the gain equalizer 102 is output from the optical amplifier 202 via the optical transmission part 48 and the outputting port 200b.

As mentioned above, in the gain equalizer 102 according to the fifth embodiment, ⅓ of a request loss characteristic can be set to the gain equalizing unit 32, so the gain equalizer 102 is easily manufactured and cost of the gain equalizer 102 can be reduced. The optical amplifier 202 according to the fifth embodiment can flatten and amplify the WDM optical signal by using minimum components. Comparing with a configuration in which three gain equalizers combined for flattening, the number of components of the optical amplifier 202 can be reduced. Therefore, the optical amplifier 202 with low cost can be provided.

Here, in the fifth embodiment, although the optical amplification unit 4f is arranged in front stage of the gain equalizer 102, the gain equalizer 102 may be arranged in front stage of the optical amplification unit 4f. In such configuration, because the optical signal of low level by being given loss characteristic many times from the gain equalizer 102 is amplified, the noise figure thereof deteriorates.

In the gain equalizers 100, 100b, 101 and 102 according to the above mentioned exemplary embodiments, the input part includes first to N-th input ports 11-1N (N: an integer no less than 2) and the outputting part includes first to N-th outputting ports 21-2N corresponding to the first to N-th input ports 11-1N respectively. Here, the first to (N−1)-th outputting ports 21-2 (N−1) are connected with the second to N-th input ports 12-1N respectively. The first input port 11 receives the wavelength multiplexed optical signal. The gain equalizing units 30, 31 and 32 give the loss to the wavelength multiplexed optical signal received by each of the first to N-th input ports 11-1N and outputs it to each of the first to N-th outputting ports 21-2N respectively. And, the N-th outputting port 2N outputs the wavelength multiplexed optical signal given N times losses.

In the gain equalizers 100b, 101 and 102 according to the above mentioned exemplary embodiments, the gain equalizing units 100b, 101 and 102 include a filter 3a for giving the loss to the wavelength multiplexed optical signal and optical members 3b, 3c for outputting the wavelength multiplexed optical signal received by each of the first to N-th input ports 11-1N to each of the first to N-th outputting ports 21-2N through the filter 3a respectively.

In the optical amplifiers 200, 201 and 202 according to the above mentioned exemplary embodiments, the gain equalizers 101, 102 include first to N-th input ports 11-1N (N: an integer no less than 2) and first to N-th outputting ports 21-2N corresponding to the first to N-th input ports 11-1N respectively. Here, the first to (N−1)-th outputting ports 21-2(N−1) are connected with the second to N-th input ports 12-1N respectively. The first input port 11 receives the wavelength multiplexed optical signal. The gain equalizers 101, 102 give the loss to the wavelength multiplexed optical signal received by each of the first to N-th input ports 11-1N and outputs it to each of the first to N-th outputting ports 21-2N respectively. And, the N-th outputting port 2N outputs the wavelength multiplexed optical signal given N times the loss.

In the optical amplifiers 200, 201 and 202 according to the above mentioned exemplary embodiments, the gain equalizers 101, 102 include a filter 3a for giving the loss to the wavelength multiplexed optical signal and optical members 3b, 3c for outputting the wavelength multiplexed optical signal received by each of the first to N-th input ports 11-1N to each of the first to N-th outputting ports 21-2N through the filter 3a respectively.

In the optical amplifiers 200, 201 and 202 according to the above mentioned exemplary embodiments, the gain equalizers 101, 102 receive an amplified wavelength multiplexed optical signal output from the optical amplification units 4a, 4c and 4f.

The optical amplifiers 200, 201 according to the above mentioned exemplary embodiments further include another optical amplification units 4b, 4e for receiving a wavelength multiplexed optical signal which is given N times the loss and is output from the gain equalizer 101.

The optical amplifier 201 according to the above mentioned exemplary embodiments further include a first detection circuit 8 for detecting intensity of the wavelength multiplexed optical signal entering the optical amplification unit 4c, a second detection circuit 9 for detecting intensity of the wavelength multiplexed optical signal outputted from the another optical amplification unit 4d, a control circuit 10 for determining attenuation based on the two detection results and an attenuation unit 6 for adjusting intensity of the wavelength multiplexed optical signal being to enter a first input port 11 of the gain equalizer 101 based on the determined attenuation.

The loss compensating method according to the above mentioned exemplary embodiments further include giving the loss to the wavelength multiplexed optical signal received by each of first to N-th input ports 11-1N and outputting it to each of first to N-th outputting ports 21-2N respectively. Here, the first to (N−1)-th outputting ports 21-2(N−1) are connected with the second to N-th input ports 12-1N respectively.

The optical amplification method according to the above mentioned exemplary embodiments further include giving the loss to the wavelength multiplexed optical signal received by each of first to N-th input ports 11-1N and outputting it to each of first to N-th outputting ports 21-2N respectively. Here, the first to (N−1)-th outputting ports 21-2(N−1) are connected with the second to N-th input ports 12-1N respectively.

The optical amplification method according to the above mentioned exemplary embodiments further include giving the loss repeatedly to the amplified wavelength multiplexed optical signal.

The optical amplification method according to the above mentioned exemplary embodiments further include another amplifying intensity of the wavelength multiplexed optical signal which is given the loss repeatedly.

The optical amplification method according to the above mentioned exemplary embodiment further include detecting intensity of the amplified wavelength multiplexed optical signal, another detecting intensity of the another amplified wavelength multiplexed optical signal, determining attenuation based on the two detection results and adjusting intensity of the wavelength multiplexed optical signal before being given the loss repeatedly based on the determined attenuation.

Here, when the gain equalizer of the related art 2 described in the background art is used for compensation a variation of intensity among optical signals of different wavelengths in a WDM optical signal, following problems occur. That is, a loss characteristic required for compensation a variation of loss among optical signals each having a different wavelength in a WDM optical signal is given to the gain equalizer of the related art 2.

Because the loss characteristic to be set to the gain equalizer of the related art 2 becomes large, manufacture thereof becomes difficult, and cost thereof becomes high.

In an instrument (for example, an optical amplifier) including the gain equalizer of the related art 2, when a request loss characteristic is larger than the loss characteristic which can be given to the gain equalizer, it is necessary to install a plurality of gain equalizers in the instrument. Accordingly, the number of components in the instrument increases and the instrument becomes costly.

On the other hand, when the gain equalizer and the loss compensation method according to the present invention are used for compensation a variation of intensity among optical signals of different wavelengths in a WDM optical signal, following advantages are made. That is, the gain equalizer according to the present invention gives a loss to the WDM optical signal N times (N: an integer no less than 2), and output it to an outputting port. The loss is a loss characteristic required for compensation a variation of loss among optical signals in a WDM optical signal and is set to the gain equalizer in advance. The WDM optical signal can be given the loss larger than the loss characteristic set to the gain equalizing unit. The loss set to the gain equalizing unit of the gain equalizer can be small, so the gain equalizer is easily manufactured and the gain equalizer with a low cost can be provided.

An optical amplifier and an optical amplification method of the present invention generate following advantages. That is, the optical amplifier includes the above-mentioned gain equalizer can make a WDM optical signal enter the gain equalizing unit N times. The WDM optical signal entered the gain equalizing unit N times is given a loss characteristic which is opposite of wavelength dependency of the gain of the optical amplifier.

The optical amplifier and the optical amplification method according to the present invention need not to include a popularity of components for flattening. Accordingly, a low-cost optical amplifier and an optical amplification method using the above-mentioned gain equalizer can be provided.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A gain equalizer for compensation a variation of intensity among a plurality of optical signals each including a different wavelength in a wavelength multiplexed optical signal, comprising:
   an input part for receiving said wavelength multiplexed optical signal;
   an outputting part; and
   a filter for giving a loss, which is set for each wavelength in said wavelength multiplexed optical signal and has a loss characteristic which is set as 1/N, where N is an integer no less than 2, of a loss characteristic required for compensating said variation of intensity, repeatedly to said wavelength multiplexed optical signal received by said input part and outputting said wavelength multiplexed optical signal to said outputting part.

2. The gain equalizer according to claim 1,
   wherein said input part includes first to N-th input ports (N: an integer no less than 2) and said outputting part includes first to N-th outputting ports corresponding to said first to N-th input ports respectively,
   wherein said first to (N−1)-th outputting ports are connected with said second to N-th input ports respectively, and wherein said first input port receives said wavelength multiplexed optical signal, said filter gives said loss to said wavelength multiplexed optical signal received by each of said first to N-th input ports and outputs it to each of said first to N-th outputting ports respectively, and said N-th outputting port outputs said wavelength multiplexed optical signal given N times losses.

3. The gain equalizer according to claim 2,
wherein said filter includes a filter for giving said loss to said wavelength multiplexed optical signal and an optical member for outputting said wavelength multiplexed optical signal received by each of said first to N-th input ports to each of said first to N-th outputting ports through said filter respectively.

4. An optical amplifier, comprising:
a filter for giving a loss, which is set for each of a plurality of wavelengths in a wavelength multiplexed optical signal and has a loss characteristic which is set as 1/N, where N is an integer no less than 2, of a less characteristic required for compensating a variation of intensity among a plurality of optical signals corresponding to the plurality of wavelengths and within the wavelength multiplexed optical signal, repeatedly to said wavelength multiplexed optical signal; and
an optical amplification unit connected with said filter.

5. The optical amplifier according to claim 4,
wherein said filter includes first to N-th input ports (N: an integer no less than 2) and first to N-th outputting ports corresponding to said first to N-th input ports respectively,
wherein said first to (N−1)-th outputting ports are connected with said second to N-th input ports respectively, and
wherein said first input port receives said wavelength multiplexed optical signal, said filter gives said loss to said wavelength multiplexed optical signal received by each of said first to N-th input ports and outputs it to each of said first to N-th outputting ports respectively, and said N-th outputting port outputs said wavelength multiplexed optical signal given N times said loss.

6. The optical amplifier according to claim 5,
wherein said filter includes a filter for giving said loss to said wavelength multiplexed optical signal and an optical member for outputting said wavelength multiplexed optical signal received by each of said first to N-th input ports to each of said first to N-th outputting ports through said filter respectively.

7. The optical amplifier according to claim 4,
wherein said filter receives an amplified wavelength multiplexed optical signal output from said optical amplification unit.

8. The optical amplifier according to claim 7,
further comprising another optical amplification unit for receiving a wavelength multiplexed optical signal which is given N times said loss and is output from said filter.

9. The optical amplifier according to claim 8, further comprising:
a first detection circuit for detecting intensity of said wavelength multiplexed optical signal entering said optical amplification unit;
a second detection circuit for detecting intensity of said wavelength multiplexed optical signal outputted from said another optical amplification unit;
a control circuit for determining attenuation based on said two detection results; and
an attenuation unit for adjusting intensity of said wavelength multiplexed optical signal being to enter a first input port of said filter based on said determined attenuation.

10. A loss compensation method for compensation a variation of intensity among a plurality of optical signals each including a different wavelength in a wavelength multiplexed optical signal, comprising:
receiving said wavelength multiplexed optical signal;
giving a loss, which is set for each wavelength in said wavelength multiplexed optical signal and has a loss characteristic which is set as 1/N, where N is an integer no less than 2, of a less characteristic required for compensating said variation of intensity, repeatedly to said received wavelength multiplexed optical signal; and
outputting said wavelength multiplexed optical signal with said loss.

11. The loss compensating method according to claim 10 further comprising:
giving said loss to said wavelength multiplexed optical signal received by each of first to N-th input ports and outputting it to each of first to N-th outputting ports respectively,
wherein said first to (N−1)-th outputting ports are connected with said second to N-th input ports respectively.

12. An optical amplification method, comprising:
receiving a wavelength multiplexed optical signal;
amplifying intensity of said wavelength multiplexed optical signal;
giving a loss, which is set for each of a plurality of wavelengths in said wavelength multiplexed optical signal and has a loss characteristic which is set as 1/N, where N is an integer no less than 2, of a less characteristic required for compensating a variation of intensity among a plurality of optical signals corresponding to the plurality of wavelengths and within the wavelength multiplexed optical signal, repeatedly to said wavelength multiplexed optical signal; and
outputting said wavelength multiplexed optical signal which is amplified and given said loss.

13. The optical amplification method according to claim 12 further comprising:
giving said loss to said wavelength multiplexed optical signal received by each of first to N-th input ports and outputting it to each of first to N-th outputting ports respectively,
wherein said first to (N−1)-th outputting ports are connected with said second to N-th input ports respectively.

14. The optical amplification method according to claim 12 further comprising: giving said loss repeatedly to said amplified wavelength multiplexed optical signal.

15. The optical amplification method according to claim 14 further comprising:
another amplifying intensity of said wavelength multiplexed optical signal which is given said loss repeatedly.

16. The optical amplification method according to claim 15 further comprising:
detecting intensity of said amplified wavelength multiplexed optical signal;
another detecting intensity of said another amplified wavelength multiplexed optical signal;
determining attenuation based on said two detection results; and
adjusting intensity of said wavelength multiplexed optical signal before being given said loss repeatedly based on said determined attenuation.

17. A gain equalizer for compensation a variation of intensity among a plurality of optical signals each including a different wavelength in a wavelength multiplexed optical signal, comprising:
- an input means for receiving said wavelength multiplexed optical signal;
- an outputting means; and
- filtering means for giving a loss, which is set for each wavelength in said wavelength multiplexed optical signal and has a loss characteristic which is set as $1/N$, where N is an integer no less than 2, of a loss characteristic required for compensating said variation of intensity, repeatedly to said wavelength multiplexed optical signal received by said input means and for outputting said wavelength multiplexed optical signal to said outputting means;
- wherein said loss is set for each wavelength in said wavelength multiplexed optical signal and is smaller than a loss characteristic required for compensation said variation of intensity.

18. An optical amplifier, comprising:
- filtering means for giving a loss, which is set for each of a plurality of wavelengths in a wavelength multiplexed optical signal and has a loss characteristic which is set as $1/N$, where N is an integer no less than 2, of a less characteristic required for compensating a variation of intensity among a plurality of optical signals corresponding to the plurality of wavelengths and within the wavelength multiplexed optical signal, repeatedly to said wavelength multiplexed optical signal; and
- an optical amplification means connected with said gain equalizing means;
- wherein said loss is set responding to a wavelength dependency of gain of said optical amplification means and is smaller than a loss characteristic which is opposite to said wavelength dependency.

* * * * *